United States Patent
Lablans

(10) Patent No.: US 12,425,739 B2
(45) Date of Patent: Sep. 23, 2025

(54) CAMERA DIGITAL GIMBAL SYSTEM

(71) Applicant: Peter Lablans, Morris Township, NJ (US)

(72) Inventor: Peter Lablans, Morris Township, NJ (US)

( * ) Notice: Subject to any disclaimer, the term of this patent is extended or adjusted under 35 U.S.C. 154(b) by 0 days.

(21) Appl. No.: 18/827,789

(22) Filed: Sep. 8, 2024

(65) Prior Publication Data

US 2024/0430573 A1    Dec. 26, 2024

Related U.S. Application Data

(63) Continuation-in-part of application No. 17/866,525, filed on Jul. 17, 2022, now abandoned, which is a continuation-in-part of application No. 17/037,228, filed on Sep. 29, 2020.

(51) Int. Cl.
| | |
|---|---|
| *H04N 23/695* | (2023.01) |
| *H04N 23/58* | (2023.01) |
| *H04N 23/698* | (2023.01) |

(52) U.S. Cl.
CPC ......... *H04N 23/695* (2023.01); *H04N 23/58* (2023.01); *H04N 23/698* (2023.01)

(58) Field of Classification Search
CPC .... H04N 23/58; H04N 23/695; H04N 23/698; H04N 23/90; H04N 23/45
USPC ........................................................ 348/373
See application file for complete search history.

(56) References Cited

U.S. PATENT DOCUMENTS

| | | | |
|---|---|---|---|
| 5,947,359 A | 9/1999 | Yoshie | |
| 6,900,837 B2 | 5/2005 | Muramatsu et al. | |
| 6,972,796 B2* | 12/2005 | Katta | H04N 25/76 |
| | | | 348/E7.086 |
| 7,161,618 B1 | 1/2007 | Niikawa et al. | |
| 7,209,176 B2 | 4/2007 | Chapman | |
| 7,355,305 B2 | 4/2008 | Nakamura et al. | |
| 7,418,275 B2 | 8/2008 | Yiu | |

(Continued)

FOREIGN PATENT DOCUMENTS

| | | |
|---|---|---|
| CN | 112887554 | 6/2021 |
| GB | 1021736.2 | 12/2010 |

OTHER PUBLICATIONS

Wikipedia, Image stabilization, online webpage at https://en.wikipedia.org/w/index.php?title=Image_stabilization&oldid=892981277, last edited on Apr. 18, 2019.

(Continued)

*Primary Examiner* — Pritham D Prabhakher

(57) ABSTRACT

A camera system has at least a first and a second camera which are attached to a common platform, each camera having a lens and an image sensor. Active areas of the image sensors of the first and second camera are determined. Image data only gathered from active areas of image sensors establish a panoramic image, which may be called an extended image space. Position sensors allow a processor to determine a location and a pose of the camera system. Coordinates of the extended image space are associated with a position of an object in physical space relative to a pointing direction of the camera system. A screen displays image data of a window of preset size around the image of the object in extended image space. A neural network is used to train the camera system to predict a position of an object based on camera rotations.

20 Claims, 11 Drawing Sheets

(56) References Cited

U.S. PATENT DOCUMENTS

| | | | |
|---|---|---|---|
| 7,495,694 B2 * | 2/2009 | Cutler | H04N 23/58 352/69 |
| 7,616,248 B2 | 11/2009 | Parulski et al. | |
| 7,667,765 B2 | 2/2010 | Turley et al. | |
| 7,676,150 B2 | 3/2010 | Nakashima | |
| 7,688,203 B2 | 3/2010 | Rockefeller et al. | |
| 7,688,306 B2 | 3/2010 | Wehrenberg et al. | |
| 7,734,254 B2 | 6/2010 | Frost et al. | |
| 7,741,961 B1 | 6/2010 | Raffi et al. | |
| 7,835,736 B2 | 11/2010 | Larocca | |
| 8,180,410 B2 | 5/2012 | Kim | |
| 8,355,042 B2 | 1/2013 | Lablans | |
| 8,416,282 B2 * | 4/2013 | Lablans | G03B 5/00 348/36 |
| 8,896,697 B2 | 11/2014 | Golan et al. | |
| 9,041,898 B1 | 5/2015 | Reilly et al. | |
| 9,874,308 B2 | 1/2018 | Saika et al. | |
| 9,939,608 B2 | 4/2018 | Peng et al. | |
| 10,033,303 B2 | 7/2018 | Liu et al. | |
| 10,095,942 B2 | 10/2018 | Mentese et al. | |
| 10,104,286 B1 * | 10/2018 | Yu | H04N 23/698 |
| 10,203,515 B2 | 2/2019 | Liu et al. | |
| 10,205,879 B2 | 2/2019 | Segapelli | |
| 10,274,129 B2 | 4/2019 | Saika | |
| 10,277,821 B2 | 4/2019 | Shigeoka | |
| 10,277,858 B2 | 4/2019 | Kankaanpaa et al. | |
| 10,281,737 B2 | 5/2019 | Park et al. | |
| 10,284,782 B2 | 5/2019 | Yamazaki | |
| 10,354,407 B2 | 7/2019 | Lablans | |
| 10,585,344 B1 | 3/2020 | Lablans | |
| 10,616,503 B2 * | 4/2020 | Lu | G06F 1/1686 |
| 10,795,006 B2 | 10/2020 | Garcia et al. | |
| 10,819,912 B2 * | 10/2020 | Jin | H04N 13/243 |
| 10,831,093 B1 | 11/2020 | Lablans | |
| 10,896,327 B1 | 1/2021 | Lablans | |
| 11,049,218 B2 * | 6/2021 | Khwaja | G06T 3/4038 |
| 11,119,396 B1 | 9/2021 | Lablans | |
| 11,470,249 B1 * | 10/2022 | Gupta | H04N 23/951 |
| 11,848,349 B1 | 12/2023 | Keefe et al. | |
| 2004/0252759 A1 * | 12/2004 | John Winder | H04N 19/87 375/E7.251 |
| 2007/0254640 A1 | 11/2007 | Bliss | |
| 2009/0086015 A1 | 4/2009 | Larsen et al. | |
| 2009/0153686 A1 | 6/2009 | Huang | |
| 2010/0097442 A1 * | 4/2010 | Lablans | G03B 37/04 348/222.1 |
| 2010/0214398 A1 | 8/2010 | Goulart et al. | |
| 2010/0245585 A1 | 9/2010 | Fisher et al. | |
| 2011/0058052 A1 | 3/2011 | Bolton et al. | |
| 2011/0205340 A1 | 8/2011 | Garcia et al. | |
| 2017/0302852 A1 | 10/2017 | Lam | |
| 2018/0027180 A1 * | 1/2018 | Baldwin | H04N 23/45 348/38 |
| 2019/0011932 A1 | 1/2019 | McGrath | |
| 2019/0066305 A1 * | 2/2019 | Liao | G06T 7/13 |
| 2019/0082110 A1 * | 3/2019 | Jin | H04N 13/239 |
| 2019/0082114 A1 * | 3/2019 | Jeon | H04N 23/698 |
| 2019/0180468 A1 | 6/2019 | Hildreth | |
| 2020/0020075 A1 * | 1/2020 | Khwaja | G06T 5/70 |
| 2020/0077023 A1 | 3/2020 | Kang et al. | |
| 2020/0382702 A1 * | 12/2020 | Oberdoerster | H04N 23/69 |
| 2024/0040250 A1 | 2/2024 | Shi et al. | |

OTHER PUBLICATIONS

Niftychic, Micro Security Camera, downloaded from https://niftychic.net/products/micro-security-camera?variant=8855162224701&gclid=EAlalQobChMlvObs6t_74QIVkozlCh3ekA5JEAQYBCABEgJRIPD_BWE.

Jim Morrison et al., Apple iphone SE Teardown, downloaded May 15, 2019 from http://www.chipworks.com/ko/node/359.

Omnivision, OVM9724 CameraCubeChip, Product Brief, downloaded from https://www.ovt.com/download/sensorpdf/144/OmniVision_OVM9724.pdf.

Naneye/Naneye Stereo, Miniature Camera Module, Datasheet DS000501, 2018-)ct-05 downloaded from https://ams.com/documents/20143/36005/NanEye_NanEyeStereo_DS000501_2-02.pdf/f46c15da-52fb-78fd-aea6-faf4cf784da2.

Dr. Ing. Janocha, Saarland University, Microactuators—Principles, Applications, Trends, dowloaded May 14, 2019 from http://www.lpa.uni-saarland.de/pdf/a2-1.pdf.

Squiggle Micro Motor Technology, Inside the M3 Module, dowloaded on May 21, 2019 from https://www.newscaletech.com/resources/technology/squiggle-micro-motor-technology/.

Adam Ciecko et al., Analysis of the Accuracy and Usefulness of MEMS Chipsets Embedded in Popular Mobile Phones in Inertial Navigation, I 2019 IOP Conf. Ser.: Earth Environ. Sci. 221 012070.

La Rosa et al., Optical Image Stabilization (OIS), STMicroelectronics, downloaded from https://www.st.com/content/ccc/resource/technical/document/white_paper/c9/a6/fd/e4/e6/4e/48/60/ois_white_paper.pdf/files/ois_white_paper.pdf/jcr:content/translations/en.ois_white_paper.pdf.

Dahary et al., Digital Gimbal: End-to-end Deep Image Stabilization with Learnable Exposure Times, 2021, downloaded from https://arxiv.org/pdf/2012.04515.pdf.

Souza et al., Digital video stabilization based on adaptive camera trajectory smoothing; Souza and Pedrini EURASIP Journal on Image and Video Processing (2018) 2018:37 https://doi.org/10.1186/s13640-018-0277-7.

Souza et al., Digital Video Stabilization: Algorithms and Evaluation; downloaded from https://sol.sbc.org.br/index.php/ctd/article/download/6338/6235/.

Guilluy et al., Video stabilization: overview, challenges and perspectives, 2021 downloaded from https://www.sciencedirect.com/science/article/pii/S0923596520301697.

Guenter et al. Highly curved image sensors: a practical approach for improved optical performance, https://doi.org/10.1364/OE.25.013010.

Sigurd Ljodal Master's Thesis 2014, Implementation of a real-time distributed video processing pipeline, downloaded from https://core.ac.uk/download/pdf/30903173.pdf.

Espen Oldeide Helgedagsrud in Master's Thesis Efficient implementation and processing of a real-time panorama video pipeline with emphasis on dynamic stitching; downloaded from https://www.duo.uio.no/bitstream/handle/10852/37683/Helgedagsrud-master.pdf?sequence=2&isAllowed=y.

Bagadus: An Integrated Real-Time System for Soccer Analytics, Hakon Kvale Stensland et al. 2014, ACM Transactions on Multimedia Computing, Communications and Applications, vol. 10, No. 1s, Article 14, Publication date: Jan. 2014.

Di Febbo et al., Real-Time Image Distortion Correction: Analysis and Evaluation of FPGA-Compatible Algorithms, 2916 downloaded from https://arxiv.org/pdf/1610.09712.pdf.

Van der Jeught S, Buytaert JN, Dirckx JJ; Real-time geometric lens distortion correction using a graphics processing unit. Opt. Eng. 0001;51(2):027002-1-027002-5. doi:10.1117/1.OE.51.2.027002.

Thinh Huynh, A Study on Motion Control of Gimbal-based Target Tracking System, Feb. 2022, Pukyong National University, downloaded from https://repository.pknu.ac.kr:8443/bitstream/2021.oak/24416/2/A%20Study%20on%20Motion%20Control%20of%20Gimbal-based%20Target%20Tracking%20System.pdf.

Lee et al, 3D Video Stabilization with Depth Estimation by CNN-based Optimization, 2021, downloaded from https://openaccess.thecvf.com/content/CVPR2021/papers/Lee_3D_Video_Stabilization_With_Depth_Estimation_by_CNN-Based_Optimization_CVPR_2021_paper.pdf.

VIDIO from MOSAIK Studio, Inc. of Orlando FL downloaded from www.vidio.ai.

Hagui et al. A Comparison of OpenCV Algorithms for Human Tracking with a Moving Perspective Camera, EUVIP2021—9th European Workshop on Visual Information Processing, Jun. 2021, Paris (virtuel), France. ff10.1109/EUVIP50544.2021.9483957ff. ffhal-03248524f.

OpenCV Camera Calibration downloaded from in https://docs.opencv.org/4.x/dc/dbb/tutorial_py_calibration.html w.

(56) References Cited

OTHER PUBLICATIONS

Camera Matrix Lecture downloaded from https://www.cs.cmu.edu/~16385/s17/Slides/11.1_Camera_matrix.pdf.
Lecture 12: Camera Projection published by Penn State University at https://www.cse.psu.edu/~rtc12/CSE486/lecture12.pdf.
Computer Vision with Tensowflow downloaded from https://www.tensorflow.org/tutorials/images.
Bogdan et al. Calibration of Wide Field-of-View Cameras, CVMP '18, Dec. 13-14, 2018, London, United Kingdom, downloaded from https://doi.org/10.1145/3278471.3278479.
Bogdan, DeepCalib Software downloaded from https://github.com/alexvbogdan/DeepCalib.
Shavit et al. Introduction to Camera Pose Estimation, downloaded from https://arxiv.org/pdf/1907.05272.
Victor Zhou CNNs, Part 1: Training a Convolutional Neural Network, downloaded from https://victorzhou.com/blog/intro-to-cnns-part-1/.
Victor Zhou CNNs, Part 2: Training a Convolutional Neural Network, downloaded from https://victorzhou.com/blog/intro-to-cnns-part-2/.
Stephanie Doyle AI 101, 2023 downloaded from https://www.backblaze.com/blog/ai-101-gpu-vs-tpu-vs-npu/.

\* cited by examiner

CAMERA DIGITAL GIMBAL SYSTEM

STATEMENT OF RELATED CASES

This application is a continuation-in-part and claims the benefit of U.S. Non-provisional patent application Ser. No. 17/866,525 filed on Jul. 17, 2022 which is incorporated herein by reference, application Ser. No. 17/866,525 is a continuation-in-part and claims the benefit of U.S. Non-provisional patent application Ser. No. 17/037,228, filed on Sep. 29, 2020 which is incorporated herein by reference. The following patent applications are incorporated herein by reference: U.S. Non-provisional patent application Ser. No. 17/472,658 filed on Sep. 12, 2021; U.S. Non-provisional patent application Ser. No. 16/423,357 filed on May 28, 2019, now U.S. Pat. No. 10,831,093 issued on Nov. 10, 2020; U.S. Non-provisional patent application Ser. No. 16/508,031 filed on Jul. 10, 2019 now U.S. Pat. No. 10,896,327 issued on Jan. 19 2021; U.S. Non-provisional application Ser. No. 15/645,545 filed on Jul. 10, 2017, now U.S. Pat. No. 10,354,407 issued on Jul. 16, 2019; U.S. Non-provisional patent application Ser. No. 16/814,719 filed on Mar. 10, 2020 now U.S. Pat. No. 11,119,396 issued on Sep. 14, 2021; U.S. Non-provisional patent application Ser. No. 16/011,319 filed on Jun. 30, 2018 now U.S. Pat. No. 10,585,344 issued on Mar. 10, 2020. All above cases are incorporated herein by reference.

BACKGROUND OF THE INVENTION

Currently mechanical gimbals are used to assist in tracking an object or stabilize a video image recorded with a moving camera. These mechanical gimbals are separate devices and often unwieldy to carry and install. Internal mechanical gimbals covering a sufficient field of view in consumer cameras are believed not to exist, as current internal gimbals or stabilizers only cover very small deviations. Furthermore, internal mechanical gimbals are relatively expensive to build and to control and introduce additional points of mechanical failure in for instance a smartphone which is subject to many mechanical shocks and bumps. Accordingly, a novel imaging platform internal to a device that acts as a controlled digital gimbal at least in one coordinate but has fewer or no moving parts and is able to track an object in a large field of view is required.

SUMMARY OF THE INVENTION

Aspects of the present invention relate to digital image devices. More specifically, it relates to a portable and mobile computing device with a housing and internal to that housing a plurality of cameras with a combined field of view greater than achievable with a single of those plurality of cameras, including panoramic images. The camera with the large field-of-view has, what is called herein, an extended image space. Extended means: greater than the image space of a single camera for instance. An image space may be expressed as field-of-view and/or number of pixels of equal size in an image space. The extended image space is used to create windows smaller than the image space around a scene and/or object in the field-of-view of the camera with the extended image space. This enables a stable image, including a video image of a scene and/or an object displayed on a display or screen, wherein one or more aspects work as a digital or e-gimbal.

The cameras are attached to a common platform, which may be a housing of a camera system or a platform, for instance a movable platform inside a housing. Preferably, no matter how the platform or housing are constructed, the two or more cameras are placed in a fixed position in relation to each other. Or generally, the two or more cameras are in a fixed position relative to a first camera. In that sense all cameras experience the same movement such as translation and rotation such as pitch, yaw (pan) and roll. For convenience, the structure that holds the cameras in a fixed position is called a platform herein.

One aspect of the present invention presents novel methods and systems for a processing instruction based camera platform internal to a housing of a computing device controlled by a programmed processor with input by positional and/or orientation and/or inertial sensors part of a camera system to keep the camera orientated to a point in space while the computing device that holds the camera on the rotatable platform may be moving or itself is in a fixed position while an object that is to be captured by the camera is moving, or both the camera device and the to be recorded object and or scene may be moving.

In one embodiment of the present invention, two or more cameras are fixedly attached to the same housing of a camera system, in such a manner that the images of the cameras have overlap. In a calibration step it is determined where the two images each generated by a different camera in the camera system will create a registered image. The area of the sensors that define the registered image are called active sensor areas. Each active sensor area being smaller than the entire imaging of the respective image sensor. Only image data is harvested and stored from the active area or substantially from the active area. Some extra image data may be collected for image correction and/or stitchline determination correction.

An entirety of harvested data forming a registered image is called an extended image space, being preferable an image space greater than an image space of a single camera.

Preferably the individual cameras in the cameras systems are identical with preferably curved image sensors. A shape of a housing carefully manufactured with narrow tolerance so that combining the housings of the individual camera modules forms automatically a cameras system that generates an extended image space. The extended image space may be defined as the Field of View (FOV) of the multiple cameras and is preferably larger than the FOV of a single camera.

In accordance with an aspect of the present invention camera system rotations are monitored and preferably recorded with positional and inertial sensors to determine a pointing direction and current position. The rotation and position data is applied to compute a current coordinate position of an image point of interest. A window around the image point of interest creates a stable e-gimbal window.

In one embodiment of the present invention, a moving object is tracked in the extended image space.

In accordance with one embodiment of the present invention, processing instructions are applied to correct at least pan and pitch rotation.

In accordance with one embodiment of the present invention. processing instructions are applied to correct roll rotation.

In accordance with one embodiment an artificial neural network, which is preferably a Convolutional Neural Network is trained and applied to predict and/or correct corrective action to create a stable e-gimbal image.

DETAILED DESCRIPTION

Figure 1:
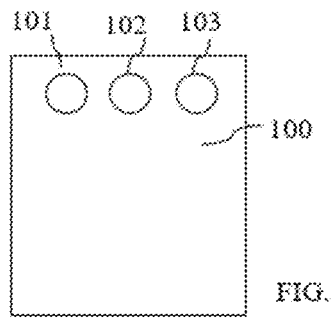
FIGS. 1 and 2 are diagrams of a camera for panoramic and/or images in frontal view in accordance with an aspect of the present invention.

A known way of creating panoramic images is combining or stitching or processing of image data generated by two or more cameras. Basically, two or more cameras each take an image of a scene. Usually fully developed images (usually demosaiced) are generated, making sure areas of overlap in the images of the scene exist. Images are then stitched together by a processor using software to find common points in areas of overlap. The software then uses image data of one camera and drops overlap data (which was only used to determine stitch or connecting lines between images) and generates a combined image that preferably gives an impression of a single continuous panoramic image of the scene.

In general some distortion and color mismatch may take place which may be corrected by known computer operations. While high quality still images may be generated, the processing time required by a processor to generate a panoramic image by this approach of image stitching is significant. For that reason, this "stitching" is commonly used for photos or still images. It is generally not used on for instance smartphones to generate panoramic video. Using stitching software to generate real-time panoramic video images currently does not exist as existing processors are not powerful enough to generate real-time video images from multiple cameras on a smartphone. The inventor on the instant aspects of the present invention as disclosed in this specification has invented a way to generate in real-time a video image on a smartphone from multiple cameras on a smartphone.

Real-time is this context is a display speed of at least 10 frames per second. This rate is used as a minimum wherein a human viewer would rate the video image still as a movie rather than a set of consecutively discernable still images. One can find on the Internet web like Youtube several examples of video at different frame speeds. For instance at https://www.youtube.com/watch?v=2Ds7EcJ2Ia4 which is incorporated herein by reference. At 8 Hz one will see a jerky movie. At 10 Hz it is slightly less so and the human mind will basically see a movie. At 15 frames per second the image appears to be a real movie and at 25 frames per second there is no doubt that at all that a movie or video is being watched. The experience also depends on the size of a display and inherent latency of pixel change. So, when teaching real-time video herein at least a frame rate of 10 frames per second is intended, more preferably a frame rate of at least 15 frames per second, more preferably a frame rate of at least 25 frames per second of a scene and more preferably at 50 frames per second or higher.

An underlying inventive concept which limits a load on processing capability is to limit the number of pixels that have to be processed by a single processor and/or a core or thread of a processor. In current digital camera technology no actual single panoramic image created from multiple cameras to start processing from, (as a type of proto-panoramic image) generally exists. A reason for that is that in current technology overlap of image data has to be evaluated by image processing to determine a stitchline between different images. In practice this often means that all image data of a camera sensor, which may be a CMOS or a CCD sensor, is harvested, usually is demosaiced to merge or process all separate data pixels into a presentable image and then start the, processor intensive, overlap detection and merging of images.

A distinction is made herein between a pixel or picture element, which is a data element representing a basic unit of an image when adequately translated or converted to a visible picture element on a screen, and a physical picture element on an image sensor. A physical picture element on an image sensor like a CMOS element is a light intensity sensor that detects light and provides as output one or more signals that represent the intensity, commonly and ultimately as a digitized signal as a binary word for instance. By using appropriate filters one may detect for each basic physical picture element (or pixel sensor) intensity of Red, Blue and Green light and provide an RGB pixel related output. A popular format of physical images sensors is the Bayer filter format as explained in https://en.wikipedia.org/wiki/Bayer_filter which is incorporated herein by reference. Bayer pixels are a set of at least 3 sensors each with a specific filter (usually Red Green Blue or RGB) from which in combination all other colors may be assembled. Variations are well known. Forming a usable image from a Bayer mosaic, requires demosaicing, forming a single color pixel from a Bayer mosaic. Demosaicing may involve additional steps, like interpolation and/or blending and the like. Demosaicing of image data of different cameras may create post processing artifacts that may be difficult to remove.

One of several inventive concepts in the current disclosure is to determine upfront, before even harvesting all relevant image data, which may include addressable physical pixel elements on for instance a CMOS image sensor, are required to create a panoramic or wide-view image. That is: only data generated by physical pixel elements in a pre-defined "active" area of an image sensor are used. All data, generated by physical pixel elements up to a defined merge line, are used. Past the merge line, data generated by physical pixel elements in an active area of an image sensor in a corresponding image sensor of another camera, is used to create the panoramic image. When the active areas are selected and implemented correctly, the harvested image data from the respective image sensors already form a basic or proto panoramic image and no merge or stitch line has to be detected. This has at least one advantage over existing digital image sensor based camera technology. One advantage is that a physical stitch-line is determined on a sensor. That is, only data on a pre-determined side of a stitch-line on a first image sensor is required to be processed and to be merged with image data harvested from a corresponding side of a stitch-line of a second image sensor, to directly create on a memory stored image data. Such image data is stored in a manner that when read as for instance image lines, an image line of a read image is a combination of two image lines of harvested image data of at least 2 image sensors at predetermined sides of respective physical stitch-lines. Preferably, the proto-panoramic image is stored in pre-de-mosaiced format. This means that in memory, even prior to further demosaicing for instance, stored image data exist that fundamentally represents an extended or panoramic image, created from two or more image sensors and/or two or more cameras. What is required to be done in old technology by a processor is basically done by just collecting and storing data from multiple image sensors.

The areas of image sensors from which image data is harvested are called "active sensor areas" herein. This means that only data from those predefined areas, determined for instance by a physical stitchline, are stored in a dedicated memory or part of a memory and processed. In general, a whole useful sensor area of a digital image sensor is available for obtaining image data. However, in accordance with an aspect of the present invention, only image data from predefined active sensor areas are harvested and stored in a memory as an image, preferably in contiguous form, so that the stored image data when being read represents a panoramic image or a substantially panoramic image.

One may create a map of an image sensor and read or scan only specific regions of interest or part of scanlines into a memory, wherein ultimately the memory contains contiguous data that in its entirety forms a combined or stitched or panoramic image frame. The direct mapping of data into contiguous data is likely the fastest way to create a contiguous image preferably in raw image data, but using demosaiced data will work also. One may also use an intermediate memory wherein all image sensor data is stored and conditions of "active areas" are imposed so and only "active area data" is copied to a next memory in contiguous form. This way allow additional intermediate processing steps.

In principle, the image data harvested from active image sensor areas may be perfectly merged so that a read out (and demosaiced) image looks like a panoramic image. There may still be effects that may require correction, like color correction, blending and possibly warping to address edge distortion. However, in principle the edges of the images of the active areas should match well, with no or limited need for correction in overlap. The finding of overlap points or stitchline is one of the most expensive (in processor time) processing steps in generating a panoramic or stitched image by image processing. This step is circumvented or dramatically reduced by defining active areas as described above. The active areas may be defined as stored parameters for use by a processor as part of an operational instruction.

With high image resolutions, it may be that over time a slight mismatch between active areas occurs, for instance by temperature or air-pressure variations. This may require an adjustment of parameters, which may be achieved by conducting, prior to generating images, a calibration step that applies overlap detection and/or stitching procedures and, based on a known map of each of the sensors, determines and then stores new and updated active area parameters. In one scenario an intermittent and carrying small mismatch of active areas may occur. In that case a processing step may be included that performs overlap determination. However such a mismatch is limited in size and will be at most a distance correction of 25 pixels, more preferably of at most 15 pixels, yet more preferable at most 10 pixels and yet more preferable at most 5 pixels. Such a variation most commonly will be a linear shift which when detected can be rapidly applied to all pixels to correct in real time a variation in overlap. Because of the limited search area for overlap, this rematching can be done very fast and is much faster than custom image stitching. However, taking into account the possibility of a need for correction one may store image data that is slightly larger than a required minimum number of pixels. In that case one may call the stored harvested image data from slightly larger areas a proto-panoramic image. That is: one or more relatively rapid processing steps may be applied to remove noise like variations in merge-lines.

The stored proto-panoramic image represents always a panoramic or an almost panoramic image with possibly a slight mismatch in overlap as explained above. The proto-panoramic designations pertains exclusively to raw image data. When demosaiced or as examined pre-demosaicing, it may become apparent that other corrections may be required, as stated above.

Thus a proto-panoramic image consists of image data that is harvested exclusively from active image sensor areas, with potentially a small margin of a strip or area of a width of maximal 25 pixels but preferably not greater than 10 or even 5 pixels stored and wherein the harvested image data from an active area including a small margin is smaller than a useful image sensor area of a camera. It is also noted that stored harvested image data from active sensor areas into a memory as a proto-panoramic image does not exclude using image data that is outside an active area including a margin. For instance image data outside an active area may be sampled and stored and used for instance for color correction or determining of warp parameters. The processing of these data may be performed in parallel and even with some delay, as it may be assumed that conditions with one, a couple or even 5 frames will not dramatically change parameters.

Standard image sensors are for instance read in lines of data and the entirety of an image sensor exposed to image light may be considered the "active area." However that is explicitly not what is intended in the current disclosure with the term "active area" of an image sensor. An active area of an image sensor is an area smaller than the entire area of active pixel elements on an image sensor able to generate image data, which may be called the useful image sensor area, or exposable image sensor area. For instance an "active area" on an image sensor may be determined by a defined line on an image sensor that separates one first area of the image sensor from another second area on the image sensor. Only image data of one of the first and second areas will be harvested and stored on a memory as part of a panoramic image. The data of the other area will not be part of the panoramic image and will not be processed as part or initial part of the panoramic image as for instance happens in image processing stitching. The "active area" of an image sensor is explicitly smaller than a "useful area" of an image sensor, a useful area being an area of an image sensor with physical pixel elements that is exposed to light when a shutter is opened.

By limiting the data that have to be processed, basically by circumventing the whole step of processor based finding of overlap and finding common stitching points, the processor has to perform fewer time consuming steps and can complete, even a rough, panoramic image by merely merging data from predetermined image sensor areas or smaller "active areas" as how they are designated herein.

There are several ways to capture or harvest image data from a smaller "active area." One is by setting scan line sizes and/or orientations. In most cases one may assume a horizontal alignment of image sensors of multiple cameras in a single frame. In that case an image line in a panoramic image is a combining or merging of active (smaller than completely available) lines of image data into a memory. One may set the scanning of a line that has k pixel elements in an array of physical sensor pixel elements from, as an illustrative example, from kstart to kend wherein the total length of the line of pixel elements is ktotal and ktotal>|kend−kstart|. As an illustrative example, an image sensor may have rows of 1280 physical pixel elements and 1024 of these rows in a 1280 by 1024 pixel elements in an array of physical pixel elements. A physical pixel elements may be a Bayer arrangement of 4 photodiodes as is known in the art. Assume that the total usable and storable image sensor area is 1280 by 1024 pixels.

In one arrangement 3 aligned cameras are used to capture a horizontal panoramic image of a scene. The required overlap between individual images may be set at minimum of 10% up to 30% in area. There are different reasons for this amount of overlap. Usually it depends on the applied stitching software. It also depends on the quality of the lenses, as lens distortion is often worse at the edges of an image. Most image distortion may and can be corrected by image software. For illustrative purposes assume that a minimum of 10% of overlap is required. In this case, forming a horizontal image from data harvested from 3 sensors with 10% overlap, one may use one image with a stitch or merge-line at 90% of a first image sensor and with an effective scan length of its pixel line of 90% of 1280 pixels.

The first camera would thus only have an active pixel line of 90% of 1280 pixels or for instance kstart=1, kend=1152 and ktotal=1280 and thus ktotal>|kend−kstart|. For a middle camera, the image scan-line would drop 10% overlap both at the begin and the end and for instance kstart=116 and kend=1149. The third (outside) camera would lose the first 10% of its overlap area and has an effective active pixel line with kstart=122 and kend=1280. In the above example it is shown that start and end position of the scan line may differ. This is because the required overlap is determined in one or more calibration steps. In a calibration step, cameras may already be fixed an aligned horizontally in a single body. The entire panoramic camera is pointed at a calibration set with sufficient marks and at predetermined distance. At that time it is determined what the correct overlap is to create a seamless merged image or a merged image that is satisfactory as a panoramic image. This determines the merge lines from which one determined the start and ending position of the scan lines.

This may be stored as camera parameters that are activated during actual recording of images. There may be environmental parameters like humidity and/or temperature and/or air pressure that affect the required settings. The settings may be associated with parameters and stored in a memory and may be activated based on measured circumstances. Manual adjustment may also be activated. That is, during start-up or after noticing inaccuracies a user may manually adjust the overlap and thus the scan line parameters by pointing the multi-camera system at a scene and with for instance a manual control or knob or menu element on a touch screen, adjust the overlap. This can be done by pointing at a scene, and in a calibration state adjust the image on a screen so an optimal panoramic image is formed. The thus determined scan line positions may be activated for a period of use. While a manual adjustment is possible, one may also use classical stitching software to find optimal overlap between images and let the software determine optimal scan line sizes and positions. Once the software on a processor has determined the optimal scan lines and scan start and end positions, these scan-lines are activated as well as how the images generated by active areas depending on the scan lines are stored and combined in memory, so that the stored image is substantially and perceivably a panoramic image.

For instance, prior to adjustment a camera may create a panoramic image line instance camera 1: kstart=1, kend=1152; camera 2: kstart=116 and kend=1149; and camera 3: kstart=122 and kend=1280. Changing parameters may require more overlap, for instance by 6 pixels at one side and 9 pixels at the other side. This means that the total active area has become smaller. Simple rules how to store the image data are derived from the new sizes and positions of the scan lines. In general one should reserve room at the ends of the beginning and ending of the first and third camera to account for changing overall size of the panoramic images. For instance, one may assume that the total size of an image will not vary more than 50 pixels at each side and use those conditions to determine the size of the scan lines and the memory to store the image data as substantially a panoramic images.

For illustrative purposes, only image extension by adding horizontal cameras has been illustrated. One may also create panoramic images in vertical direction applying the same approach as above. However, in that case one has to take into account also the vertical overlap that is required. Thus system parameters have to determine optimal overlap and determine the vertical positions in a physical pixel array where pixel line scanning will begin and end to create horizontal merge lines of active areas.

Preferably, a scan mechanism is available that is programmed to determine a rectangular scanning area of an "active area" inside the total available sensor array. In such a system one may program an active scanning area inside an image sensor and store in a memory in an appropriate order only the imaged data from the scanned area. One way to do that is to use shift registers to read partial lines and use related horizontal and vertical line address decoders as taught in U.S. Pat. Nos. 8,355,042 and 6,900,837 to Muramatsu et al. issued on May 31, 2005, which are both incorporated herein by reference.

Other ways to create contiguous image data representing a panoramic image are possible and are fully contemplated. For instance one may read all data from an image data line, but only store the data that represents the active area. A mapping rule that stores only image data from active image sensor areas in memory that may be read as a contiguous image is also contemplated. Yet another approach may include immediate data mapping between two memories, wherein a second memory contains only the data generated by active areas.

The above illustrates different ways to create stored data that in essence represents a panoramic image. This takes care of overlap issues. However, there may be other issues that need to be resolved. For instance the above may be performed on raw image data that has not yet been demosaiced. Demosaicing may include interpolation that smooths away some imperfections. It may be that different positions of cameras in one body may impose visible differences for instance in lighting conditions. Rather than processing an entire panoramic image, an image area around a merge line of both cameras involved in the overlapping area are compared. Clearly, if a panoramic image is seamless, there preferably should not be a distinguishable transition area around the merge line. Based on pixel differences between the images of the two cameras wherein one is lighter than the other a color adjustment software is applied. There are different known image processing software methods to achieve that. Furthermore, more than 3 cameras may be used in accordance with an aspect of the present invention to generate panoramic images which are preferably video images.

One aspect of creating panoramic video from multiple cameras is determining the stitch line or merge line between images. This is usually by far the most time-consuming processing need in current panoramic image techniques. The herein and in related disclosures provided method in determining combinable active areas of image sensors for harvesting image data that may be directly combined drastically limits the equivalent stitching time. Once that is achieved one basically has a panoramic video that is created and displayed in real-time in at least 10 image frames per second. To improve further quality of the video there are additional steps possible that remove for instance color mismatch, and image distortion.

The processor speed for image improving corrections has at least three aspects: 1) detecting the distortion; 2) determining parameters to correct distortion and 3) actually performing the correction. In general, steps 1 and 2 require a significant part of processor operation. In fixed and knowns cameras in a determined relative position a processor only has to determine during a calibration what the necessary corrective parameters are. For instance warping or homography to correct an area of distorting are determined during a calibration and may depend on one or more object or scene parameters, as well as known lens parameters, distance of object(s) to camera and other scene and/or camera settings. One may then pre-compute optimal correction parameters and store them in memory, to be (if so desired automatically) retrieved based on actual recording circumstances. In that case no further processor time or very limited processor time has to be spent on computing settings. This is especially valid for corrected warping for which the parameters will most likely be stable. The same goes for distance dependable parameters. Color correction may take more time, because lighting conditions may be more variable.

In case of lighting condition, certain global parameters may be determined, for instance for overall light intensity and conditions. Under different light and light position conditions one may determine the color distribution of 2 overlap image areas. One may then apply a simple spectrum distributing operation that makes the color spectrum of one overlap are identical or close to identical to the color spectrum of the corresponding overlap area.

A digital video image has a size or frame size related to the lens, a resolution or density of pixels, a color scheme and a frame rate. Clearly a high resolution color video image at 120 fps contains much more data to be processed then a low resolution, gray-scale only 10 fps security camera. Currently used processors in tablet computers and smart phones are powerful enough to perform in real-time a complete 2 images stitching even high resolution gray image. A complete stitching may require less than 5 ms. Pure frame stitching by software may reach between 50-100 ms for average resolution color images. For multiple images, this may not achieve desired frame speeds. However, by using the invention of active areas as provided above. The required number of clock cycles go down substantially. Furthermore, by dealing with fixed active areas of image sensors the processor expensive computation and determination are avoided. Furthermore, because physically no stitching of imaging takes place, only storage of separately generated and processed images, expensive overhead is avoided. In fact, processing parameters may be determined for image data of each separate active sensor area and processed in parallel by separate cores, processors, GPUs or customized FPGAs as for instance offered by Xilinx, Intel and/or others, which provide real-time solutions for 4K resolution image processing.

Accordingly, the herein provided approach of defining active image sensor areas and processing only individually or substantially only individually images generated by active sensor areas. Substantially herein means that some common overhead may still be required. For instance all data must still be demosaiced in order to be displayed on a screen. Demosaicing often includes interpolation with may smooth out some inconsistencies. In that case one may determine an image area around a merge line and at least apply demosaicing to that area, instead of demosaicing only active area data.

In accordance with an aspect of the present invention, a camera system is created by placing multiple cameras fixedly in a single housing, with each camera a relative position to the other cameras that an extended image space with overlap of images is created and wherein active image sensor areas are determined so the combined image formed from the individual cameras form a contiguous panoramic or extended image space camera with a field-of-vision that is greater than that of the individual cameras. There are several steps in accordance with one or more steps of the present invention that facilitates creating a panoramic image that preferably is a real-time panoramic video image. Preferably all cameras in the panoramic camera system are identical or are complementary in their properties. When all cameras are identical it facilitates operations, because all cameras have substantially the same parameters, and thus all or most operations per camera such as scanning and scanlines, pre-warping, distortion correction, blending, lenses, focus mechanism and the like are identical. It may be desirable to operate the cameras with a global shutter mechanism rather than the popular rolling shutter, which may create unwanted artifacts.

With identical cameras hard fixed in a single housing effects that are troublesome in creating a panoramic image from a single moving camera may be avoided. For instance timing differences, parallax effects and other alignment mistakes may be completely avoided.

Other corrective processes may be implemented. For instance during operations or recording of images, a processor test may be performed to check for instance if determination of a merge line and thus of active areas is still correct and allows for correction of merge line parameters. There is a high reliability of manufacturing accuracy. One may reliably assume that during operations merge line deviation is not more than 25 pixels and preferable less than 10 pixels and more preferably less than 5 pixels in any direction. In such a case a test of deviation may be limited to a small search area of not more than the preferred deviation. This dramatically limits processing time. The same approach applied to determination of other parameters, such as parallax, distortion, color matching and that correction will be preferably not be more than 10%, preferably less than 5% and more preferably not more than 1%. Because of the limited overhead, substantially parallel or substantially individually means that not more than 50% of image processing of images generated by active areas of 2 or more individual image sensors in a multi-camera system to create a real-time panoramic video image is by a shared processor or shared processor core. In the alternative one may say that from initial harvesting/recording of image data to displaying the data in real-time panoramic video at least 50% is done on individual active area images. Preferably the individual processing may reach 75% and only at most 25% is dome by shared processing.

The above is also taught in detail in Nonprovisional patent application Ser. No. 17/472,658 filed on Sep. 12, 2021, which is incorporated herein by reference in its entirety. Also incorporated by reference in the current disclosure are all documents and references incorporated by reference that were incorporated by reference in the Ser. No. 17/472,658 application.

After applying the above, a panoramic video image has been achieved from 2 or more cameras that covers an area of vision and of display that is greater than may be achieved with a single camera. By having fixedly attached cameras, for instance in a single common housing or single holding structure, one may rely on parallel processing and real-time generation of panoramic video images. Preferably, all processors are also contained in the common housing or holding structure. In the alternative a separate co-processing unit, which is preferably portable and mobile may attached and/or connected to the cameras to perform the processing. Such a connection may be a galvanic connection or a wireless connection. In that case the cameras off-load their data to the remote processing unit. A display screen may be located on the camera unit and the generated panoramic image may be transmitted back to the unit to be displayed on its screen. A screen may also be included with the processing unit, so that a panoramic video may be viewed on a local screen. A viewing screen may also be a remote screen that is connected with either the processing unit and/or with the camera unit and allows remote viewing of the panoramic video.

Display screens are generally configured to a fixed size image such as a square image, 1 by 1 in relative dimensions, to 3 to 4, to almost 1 (vertical) by 2 (horizontal). However, panoramic images, when displayed in horizontal format may be more of a 1 by 3 or even 1 by 4 or 1 by n with n being related to a number of cameras used. This requires either multiple screens or resizing of a panoramic image to be displayed fully on a screen. In general, on a standard screen, some black bars on top/bottom may be acceptable to view a panoramic image. A reason is that one would like to take an image to make sure that scene details that would normally fall outside a single camera view will be captured. This may be achieved by having at least 2 and preferably 3 cameras in a single structure or housing. Display may be achieved by resizing the generated image so that sufficient details in vertical direction are still visible.

It is different to what is preferably be watched on a screen and what is actually created and stored. In accordance with an aspect of the present invention a panoramic video is generated that would require multiple screens to have a full size display. Commonly a smartphone, a laptop or even most of standard desktop computers only has one screen. In accordance with an aspect of the present invention, a portion of the generated panoramic image is displayed that covers or substantially covers for preferably 60%, more preferably for at least 75% and even more preferably for over 90% the viewable area of the screen. A user may move, by way of a mouse instruction, or by moving a finger or pen or other object over a touch screen, the view of the portion of the panoramic video that has been generated. That is, for instance, if a generated panoramic video has a horizontal image size of 3 screens, by moving a focus area, one may display in full screen the outmost left size portion or the utmost right portion or any portion in between in full screen.

Figure 2:
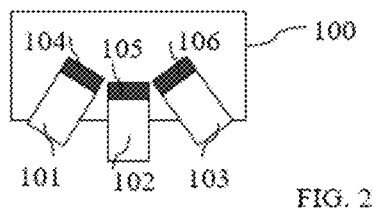
Figure 3:
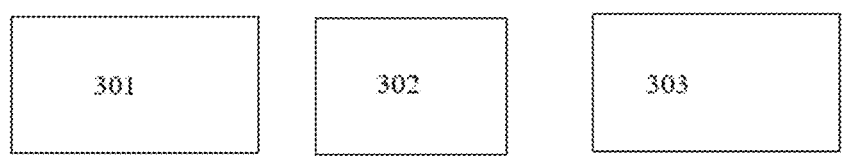
FIGS. 3 and 4 illustrate a panoramic image created in accordance with an aspect of the present invention.
Figure 4:
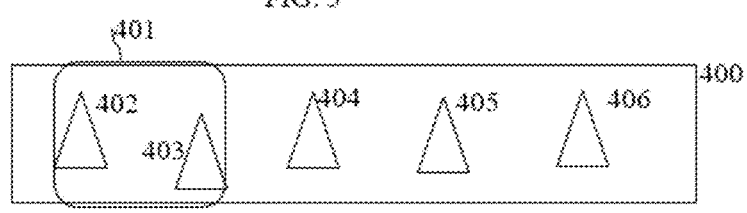

This is illustrated in FIGS. 1, 2 and 3. A body 100 in FIG. 1 contains 3 fixed cameras 101, 102 and 103 of which the lenses are shown in front side view. The three cameras will generate 3 images with overlap of a scene. By determining active sensor areas as explained above one may generate a panoramic image. In this case a horizontal panorama. It is to be understood that one may add additional cameras or use just 2 cameras. One may also extend the panorama in vertical direction by adding one or more rows of cameras above or below the row 101, 102 and 103. FIG. 2 illustrates an above cross-sectional view of camera body 100 with cameras 101, 102 and 103. One can see that the cameras are orientated under an angle to each other, allowing some overlap of generated images. Also image sensors 104, 105 and 106 of the respective cameras are illustrated. It is noted that only a schematic outline of the set-up is provided. All required connections, controls and details are omitted as not to crowd the schematic. However all these details are fully contemplated and should be assumed. Also size and placement and angles in the drawings are not accurate and are in fact exaggerated to bring across the basic idea and should not be interpreted as an engineering schematic.

FIG. 3 illustrates the individual images 301, 302 and 303 generated by the relevant active areas of the respective image sensors. One may notice that image 302 is smaller than 301 and 302, assuming that the cameras 101, 102 and 103 are identical in design. This is not required but is assumed for this illustration. Because the middle camera has of course two overlap areas, the generated image is smaller than the side cameras.

After the processing as described above the data representing a single panoramic image 400 is generated and stored, as part of a video in memory. The triangles inside 400 represent objects 402, 403, 404, 405 and 406 in a scene. In one embodiment a screen or display 401 smaller than the panoramic image 400 is assumed. By menu, touch screen or other control the screen 401 is activated is activated to display a portion or fraction of image 400 that contains objects 402 and 403. Normally one would of course not create a panoramic camera to generate a panoramic image 400 on a screen 401 to view objects 402 and 403. In that case it would be more efficient and cheaper to have a single camera with view/screen 401 and direct that single camera directly at objects 402 and 403.

In accordance with an aspect of the present invention a multi-camera panoramic video camera is configured to create a panoramic video image from which a portion representing a fixed place or an object in space is displayed. That is: the window 401 displays the part of the image that captures 402 and 403 even if the camera is moved. The camera capturing 402 and 403 may be rotationally moved, for instance into the direction of 406. Within the capturing range of the panoramic camera objects 402 and 403 are still inside the field of view of image 400. A processor of the panoramic camera, which preferably is a video camera, computes the changed attitude of the cameras and determines the portion of the image 400 in the rotated position that contains 402 and 403 and will display the objects appropriately on 401 during and after the camera has been rotated or moved.

The inventor has taught in patent application Ser. No. 17/037,228 filed on 29 Sep. 2020 and which is incorporated herein by reference, how a micro-platform is used to keep a camera directed to a fixed point in space. While extremely useful, mechanical devices, especially micro-devices are expensive to build and expensive to securely integrate in relatively small devices that are mobile and may be subject to shock and other mechanical interferences. These form potential future points of failure. It has been proven that electronic solutions, even when depending on fast processors and massive amounts of memory are ultimately more shock resistant and reliable and ultimately cheaper than mechanical solutions. The relentless improvement of speed of processors while their price get cheaper, is one reason while the herein provided point tracking solution is extremely attractive to be applied. Another reason is that high quality wide area lenses and large image sensors are expensive and ultimately it is cheaper to use multiple cheaper cameras and let a processor do the heavy lifting.

The creation of a full panoramic image may seem a waste to track only part of the image. But ultimately the cost of processors and memory will be cheaper than a mechanical solution for tracking, as illustrated by Moore's law. In fact the total increase is cost of the herein provided solution is marginal compared to benefits in stable image and tracking capability. Furthermore, only a portion of the panoramic image is actually used. For stabilization purposes, the processor may be instructed to process only those portions of the panoramic image that are relevant to the focus or stabilization area. This may further speed-up processing and lessen the demand on processing time.

Smart phones nowadays have a number of micro-electromechanical systems (MEMS) and sensors to determine a position, an attitude and an orientation of a camera. They include geographic positioning systems, inertial sensors, accelerometers, gyroscopes, magnetometers, proximity sensors for localization and the like. Extremely high performance inertial sensors and MEMS are marketed, for instance by Gladiator Technologies of Snoqualmie, WA and ACEINNA, Inc. of Tewksbury, MA. An overview of MEMS in mobile phones is provided in the article "Analysis of the Accuracy and Usefulness of MEMS Chipsets Embedded in Popular Mobile Phones in Inertial Navigation" by Adam Ciecko et al. 2019 IOP Conf. Ser.: Earth Environ. Sci. 221 012070, which is incorporated herein by reference.

Figure 8:
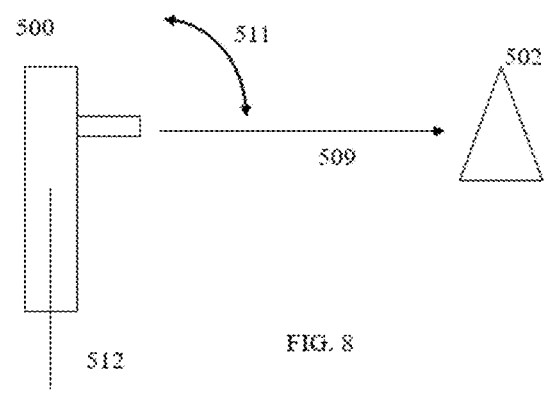

The term stabilization will appear herein. Image stabilization in cameras, either in Optical Image Stabilization (OIS) which is a mechanical system or in Electronic Image Stabilization (EIS) is known. In OIS either a lens system is moved and or rotated or an image sensor is moved or shifted. However, both OIS and EIS work over very limited distances and angles. EIS and OIS address certain forms of hand shake and vibration or jitter. Usually only in x-y direction and only sometimes in rotation or roll. Roll correction over a limited range is sometimes addressed by controlled image sensor shift. A description of camera shake/jitter and how to address it with OIS is provided in La Rosa et al. Optical Image Stabilization (OIS) from STMicroelectronics and downloaded from https://www.st.com/content/ccc/resource/technical/document/white_paper/c9/a6/fd/e4/e6/4e/48/60/ois_white_paper.pdf/files/ois_white_paper.pdf/jcr:content/translations/en.ois_white_paper.pdf which is incorporated herein by reference. FIG. 8 of the above document illustrates the common magnitude of the shake jitter effect which is mostly below 0.5 degree and almost never greater than 2 degrees. Systems that deal with correction of these magnitudes are unable to handle anything greater than 2 degrees deviation, which is the purpose of aspects of the current invention. In fact, the structures as provided herein allow for tracking a point in space or an object by a camera wherein the camera deviates over 5 degrees from a pointing direction to a static point while and generates a stable image of that point. Thus the provided system is not a stabilization system but rather a digital gimbal equivalent to a mechanical gimbal for imaging devices as known in the art.

The term "digital gimbal" is used herein, to indicate an absence of moving or motorized mechanical components as in standard gimbals. The term "digital gimbal" itself is not new, even though the inventive concepts and the embodiments of the present invention are. A recent article by Dahary et al. Digital Gimbal: End-to-end Deep Image Stabilization with Learnable Exposure, 2021 downloaded from https://arxiv.org/pdf/2012.04515.pdf and incorporated herein by reference, teaches a "digital gimbal" but is still directed to denoising and deblurring rather than acting as a wide range true gimbal. The "digital gimbal" as provided herein comes at a cost. Not only the cost of processing and sensing, but at a cost of "image waste." Image waste may range from 30% to over 70% of available image data which will not effectively be used in a displayed image. However, the operational cost of such "image waste" is negligible after the non-recurring cost of equipment. With low cost in chip based components that are not prone to rapid failure and are small and may be completely hidden inside a body, a "digital gimbal" is a very effective and attractive operational alternative to a mechanical gimbal.

Figure 5:
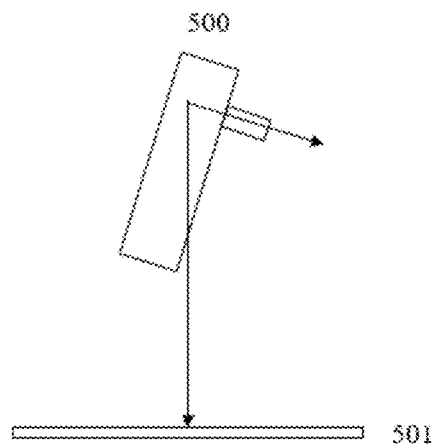
FIGS. 5, 6, 7 and 8 illustrate one or more poses of a camera system in accordance with one or more aspects of the present invention.
Figure 6:
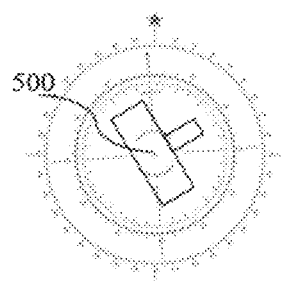
Figure 7:
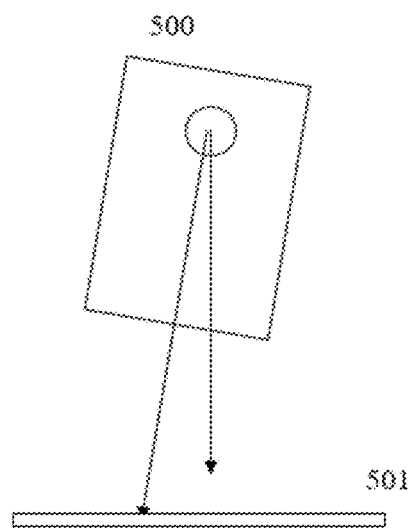

In accordance with an aspect of the present invention data representing a panoramic image or part of a panoramic image is generated by a processor. Using sensors and devices on a smartphone or a camera system, a position (including a geographical position such as a GPS position), a vertical and horizontal orientation and an altitude are determined and recorded. This is illustrated in FIGS. 5, 6 and 7. In FIG. 5 a position of a camera 500 is determined, including a relative angle towards a horizon 501 and an altitude. Furthermore, a compass orientation of a camera 500 is illustrated in FIG. 6 and a rotational orientation of a camera 500 relative to a horizon 501 is illustrated in FIG. 7. Sensors and devices in a camera system such as a smartphone also determine changes of all positions and orientations and determine new position, attitude, altitude and orientation within usually periods of microseconds or at least within a millisecond.

FIG. 8 illustrates a camera 500 orientated at an object 502. The diagram 500 only shows one lens. This is for illustration purposes only. The camera system 500 may have 2 or more cameras and lenses. To prevent overcrowding of the illustration only 1 lens is shown. It is to be understood that 2 or more cameras and thus lenses are included in system 500 with a single body that fixedly holds two or more cameras.

The system 500 has a control, which may be a touch screen, a dedicated button, an audio receiver to receive an audio signal such as a spoken word, or any other control that activates the positioning and attitude/orientation recording. By activating the control the position, altitude, pose, attitude, orientation and if required other positioning data is recorded and stored in memory. The system is pointed at an object 502. Preferably, the object 502 is initially captured in a target center 904 on a screen 902 of a camera system or a remote control screen.

All position data may be stored in a memory, especially after a control of the camera system has been activated. The following will describe several embodiments which will make the system act as a pseudo or electronic digital gimbal, even though no mechanical gimbal parts are included. The advantages includes a compact camera without clumsy attachments and a technology that creates extremely stable videos.

In one embodiment sensors included in a camera system which are known as Inertial Measurement Units (IMUs) determine a pose of a camera, for instance when pointed at an object, which may be a static object. In a mechanical gimbal system, motors may keep a lens pointed in the same direction. It does so by determining a variation or a rotation of a pointing direction. These rotations cause an object or scene at minimum to move around a field of vison of a camera and in a worst case to move outside the field of view of a camera. The good news with a multi-camera system as taught herein almost always maintains an object within a field of view, which may be 170 degrees, more preferably 180 degrees, and more preferably over 200 degrees. Of course depending on the number of individual cameras. There are at least three type of rotations that need to be countered. Pitch herein is the rotation forward and backward (seen as a static object going up and down in an image under pitch) and illustrated by arrow 511. Rotation around the vertical axis 512 is called yaw and is seen as a static object moving left to right or right to left in an image experiencing yaw. And there is roll, which is rotation of the camera around its viewing direction 509. It appears as a static object in an image being rotated.

Currently, several mechanical gimbals for smartphone cameras are on the market. One example is the OSMO gimbal marketed by DJI of China. These gimbals provide camera stability for pitch, yaw and/or roll.

Figure 9:
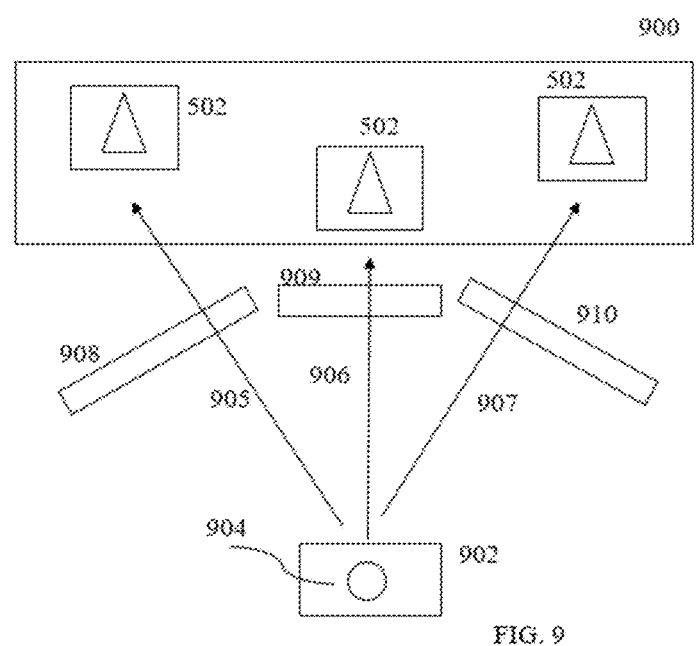
FIG. 9 is a diagram of a panoramic camera system in accordance with one or more aspects of the present invention.
Figure 10:
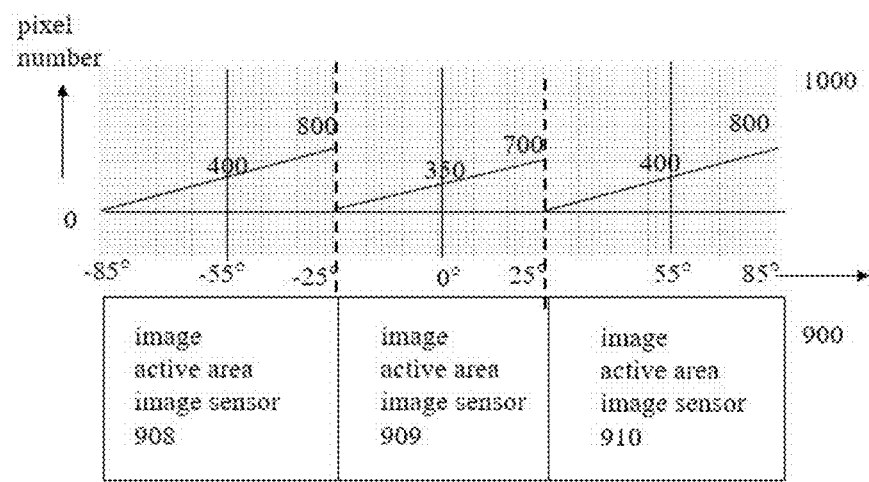
FIG. 10 illustrates in a diagram an object position calibration for a multi-camera system in accordance with one or more aspects of the present invention.

Two rotations are pitch and yaw or pan. Commonly one may prevent or limit a camera from roll if one steadily holds the smartphone. But pitch and yaw are almost unavoidable due to body movement of a user who holds a camera. In fact yaw or pan may be desirable in following an object or scene. In accordance with an aspect of the present invention, an image space of a multi-camera image generated in the herein provided manner is mapped with a relative angle of yaw of a camera. That is: pixels in the generated panoramic image are mapped to a real space pointing angle of a camera. This mapping may be performed during a calibration step. One may divide in an illustrative example a panoramic image into a rectangular linear grid of image pixels. Each pixel may then be associated with a pointing direction as determined with inertial sensors for instance. One may reduce a map size by approximating part of the mapping as being linear, allowing to apply simple interpolation to determine a pointing direction from a pixel. And conversely to determine a pixel location based on an actual pointing direction. Referring to FIG. 9 it is illustrated how pitch and yaw affect the appearance of an object in a multi-camera system. In this case a static object 502 is captured on a 3-camera image 900, wherein the camera system is experiencing yaw, which causes the object 502 in one state being captured on image sensor 908 in viewing direction 905, and the object 502 in one other state being captured on image sensor 909 in viewing direction 906, and the object 502 in one yet other state being captured on image sensor 910 in viewing direction 907. Thus the apparent movement of static object 502 in 3 camera image 900 is the result of camera movement and not of object or scene movement. The image 900 or part thereof is displayed on a screen 902. In a starting pointing position 906 the system is directly pointed in direction 906 to capture 502 in for instance a center mark 904 of screen 902. This also records the pointing direction via for instance IMUs. The object is captured by image sensor 909. The camera system creates a merged image 900 containing: an image generated by active area of image sensor 908, an image generated by active area of image sensor 909, and an image generated by active area of image sensor 910, as illustrated in FIG. 10.

In accordance with an aspect of the present invention a horizontal position of a pixel in image 900 is associated with a viewing angle relative to a straight forward viewing direction of the middle camera. Pixel locations in an image related to an active image sensor area may be counted from left to right starting from 0 and ending at the horizontal number of pixels. In a 3 camera system each camera is assumed to be identical with a horizontal FOV of 70 degrees or 35 degrees left and right. Straight ahead is 0 degrees. For the purpose of this illustration the relationship between viewing direction and pixel number is represented as being linear for demonstration purposes only. In real image technology such a relationship is most likely non-linear. For the principle of the explanation linearity is assumed. One may of course actually measure and record the relationship between pixel position and viewing angle by calibration and record, for instance in samples of 5 degrees increment in memory. The relationship calculations may be linearized across these samples by assuming that over a small range the relationship is linear.

The image generated by active area of image sensor 909 is the smallest of the three as two sides have to be used for overlap. Assume that the active area of image sensor 909 captures 700 pixels horizontally of a total of 1000 pixels horizontally and covers an angle of view of plus and minus 25 degrees. An object with a center at 0 degrees is at pixel 0 and with a center at 25 degrees is at pixel 700. The active areas of image sensors 908 and 910 are larger because only one overlap side is required. Again, a linear relationship is displayed. A true relationship can easily be determined and recorded at a calibration step. A graph 1000 in FIG. 10 reflects the relationship between a viewing direction for instance at a center of an object and a pixel position of the image of that center. One can see that the Field of View of this camera is 170 degrees and covers 2300 pixels horizontally.

Preferably, one displays an image of an object in a standard format, for instance inside a window with a horizontal length of 1000 pixels. If the original image was directed at the center of the object and displayed in the correct window then a window has to be created around the off-center (yaw experienced image) of correct size, so that the image of the object appears not to move (which it didn't) and the image has been stabilized against yaw by being displayed in a smaller window. A processor then uses the stored relationship between viewing angle and pixel position. Based on the IMU data, a new viewing direction is determined and its related center pixel position and the correct number of left and right pixels to create the image within the correct window is determined. The graph (or stored tables) are helpful herein, because a correct image of 1000 horizontal pixels may require 350 pixels from one active area and 650 pixels from another active area. This inventive approach ensures that a stable and constant image will be displayed om a screen in a window that is stable despite a camera system containing two or more cameras experiencing yaw. Furthermore, only chip based systems are required to determine a changed viewing direction using the abundance of image data of a constructed panoramic image from multiple cameras to stabilize a video image. No mechanical gimbals are required.

A system thus first sets a preferred viewing direction, it determines a yaw in a viewing direction from in system chips like IMU sensors. It determines a preferred position of a stable image as part of a panoramic image, if required using stored pixel to angle relations, computing the required size of a stable image and selecting the necessary pixels from the panoramic image to create a stable image and displaying the stable image in a predefined window.

The above demonstrates yaw correction and stabilization. In a similar way pitch correction may be applied by having multiple horizontal rows of cameras which allows correction of movement of images in a vertical direction due to camera system pitch.

Based on the above, the creation and use of multiple camera panoramic image data creation and the use of IMU sensors and other required MEMS allows to create a stable image inside a window smaller than representing a panoramic image to counter pitch and yaw of a camera system without external mechanical devices and in accordance with one or more aspects of the present invention.

Commonly handheld cameras may not experience rapid rotation around a viewing axis (axis through the lens in viewing direction). In some applications a handheld camera system may experience a movement that may be characterized as rotation or roll. In accordance with an aspect of the present invention an angle of rotation is detected and the image as determined above is rotated over an angle in an opposite direction as the determined rotation. For instance, at the start of recording an image, a position of the camera system relative to a horizon is determined and is used as a neutral position. At later times of recording, a rotation of the camera system relative to the horizon is determined and the image is rotated by an image transformation relative to the horizon by an amount counter to the determined rotation.

Figure 11:
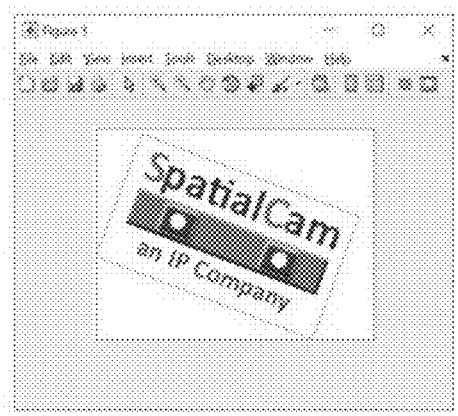
FIGS. 11 and 12 illustrate an effect of image rotation.
Figure 12:
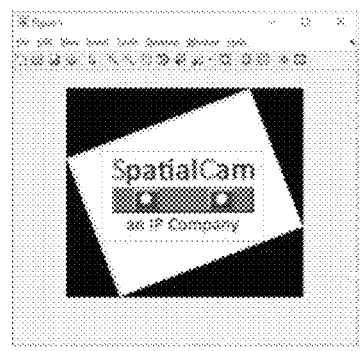

Image rotation by a processor may require additional time compared to other transformations. A reason is that image rotation may induce aliasing that requires measures like interpolation, like bilinear interpolation, to be corrected. Furthermore, grid like physical pixel arrays that are rotated provide a rotated picture inside a rectangular frame. It is not sufficient to merely rotate an image, but also correct cropping of the image inside a rectangular frame is required. Fortunately, there are sufficient fast image rotation programs available. As a demonstration one may use for instance a Matlab program with the instruction RotIm=imrotate(Im, alpha,'bilinear'). This instruction rotates an image over an angle alpha (in court-clockwise direction) and applies bilinear interpolation and crops the rotated image in a rectangular frame. The rotated images is illustrated in FIG. 11. It is a logo of the assignee of patents related to this disclosure. The camera was rotated under an angle of 21 degrees relative to horizontal lines in the logo. A rectangular screen will display the logo and logo frame as in FIG. 11. In one computer instruction, the image is rotated back by 21 degrees and the result is illustrated in FIG. 12. One can see that image has to be cropped out along the frame of the logo, to create a logo in a correct horizontal orientation. In practice that may means that a slightly greater frame is taken and processed to create the correct orientated image. The Matlab instruction on the images is used to illustrate the effects and to demonstrate that the orientation processing by a processor is fully enabled and contemplated. Real-time software is available to conduct the correction well inside real-time, and most certainly is the minimum requirement for real-time processing is set at 10 frames per second.

Software is available to perform real-time image rotation. One example is OpenCV, which is an open source image processing program suite. A description of OpenCV can be found on OpenCV.org or on one of its sub-pages which are all incorporated herein by reference. At the time of writing this disclosure OpenCV was on release 4.6.0. Descriptions of OpenCV and its modules may be found at https://docs.opencv.org/4.6.0/index.html which is incorporated herein by reference. OpenCV source code and binaries may be downloaded from GitHub and is readily available to one of ordinary skill. Real time image rotation with OpenCV is demonstrated on a Youtube video on https://www.youtube.com/watch?v=9G2YX5I0tvg by Ashwin Pajankar on Nov. 14 2017 and which is incorporated by reference herein. Commercial software that performs high resolution, real-time video rotation horizon correction is available from and demonstrated by IMINT of Uppsala, Sweden on https://weareimint.com/horizon-correction/with its Vidhance application.

In accordance with an aspect of the present invention one may use the following approach to speed-up the rotation correction. One may correct-rotate the data generated by active areas before other steps. An advantage is that smaller areas may be processed by individual processors in parallel, with a dedicated processor or processor core for each active area, or even section of an active area. This may be performed on RAW (not demosaiced) data which pushes out the interpolation to a later stage after certain transformations or processing steps are performed.

A benefit of the above approach is that a real-time video of a scene is generated by a camera system containing multiple cameras while a user may rotate the system creating yaw (or pan), pitch and roll of the camera. The above stabilization applies to movement of more than 5 degrees yaw from a neutral position, preferably more than 10 degrees yaw from a neutral position and even more preferably more than 20 degrees yaw from a neutral position. In general Electronic Image Stabilization (EIS) deals with relatively small changes called shake or jitter which are more in the range of 5 degrees. For larger movement imaging systems rely often on gimbals. The above stabilization applies to movement of more than 5 degrees pitch from a neutral position, preferably more than 10 degrees pitch from a neutral position and even more preferably more than 20 degrees pitch from a neutral position.

The above is applied to real-time video systems. In accordance with an aspect of the present invention a system may also be an off-line system that is provided with the multi-camera image data, definition of active areas and data from inertial measurements sensors and other sensors that provide data of deviations from a preferred neutral pose of a camera system or actual pointing directions and poses corresponding to recorded images. Such an off-line system allows the creation of a stable video image what in separate form would be a rather chaotic assembly of seemingly uncoordinated image data.

Digital or Electronic Processor based Image/Video stabilization is known. Most of it is based on content of an image. Different technologies and approaches are applied. They may include adaptive and predictive filters and/or trajectory predictions of a camera, based on detected elements or features in the image. These techniques are described in for instance: Souza and Pedrini, Digital video stabilization based on adaptive camera trajectory smoothing, Souza and Pedrini EURASIP Journal on Image and Video Processing (2018) 2018:37 https://doi.org/10.1186/s13640-018-0277-7, and Souza, Pedrini, Digital Video Stabilization: Algorithms and Evaluation, downloaded from https://sol.sbc.org.br/index.php/ctd/article/download/6338/6235/ and Guilluy et al, Video stabilization: overview, challenges and perspectives, 2021 downloaded from https://www.sciencedirect.com/science/article/pii/S0923596520301697, which are all incorporated herein by reference. In fact, after creating an image as disclosed above the standard methods as cited in the references may be applied to address short term or rapid changes in camera position. One can do that because ultimately an image is generated in accordance with one or more aspects of the present invention. Such an image may be subject to rapid changes and may be addressed by applying known EIS methods.

It was already noted that most current mechanical gimbal based systems are usually external to a camera system and require carrying extra and separate equipment, while internal mechanical platforms may be sensitive to shock damage and are relatively expensive compared to cheap camera and other chip based components. In accordance with an aspect of the present invention, a hybrid electronic/mechanical system is provided. In accordance with an aspect of the present invention, a plurality of cameras are positioned on a rotatable platform in a camera. That is: a platform that counters rotation or roll of a camera system around its viewing direction. This stabilizes the image relative to a horizon and now requires only yaw and pitch correction, which may take place in a much greater measure and would be more expensive to address. Furthermore a simple system may be applied to counter pitch or yaw. With or without roll compensation, in such a case only one series (either horizontally or vertically) of multiple cameras is required. For instance panoramic images are generally taken over a wide horizontal view. In that case it is beneficial to have a horizontal row of cameras. A movable platform may be used to correct mechanically a pitch of a camera.

The above is useful when it is difficult to stably hold a camera system and because of movement of the camera system an object leaves the field of view of the camera. The above approach keeps the object inside the FOV of the multicamera and generates a relatively or completely stable image on a screen of predefined size.

Figure 13:
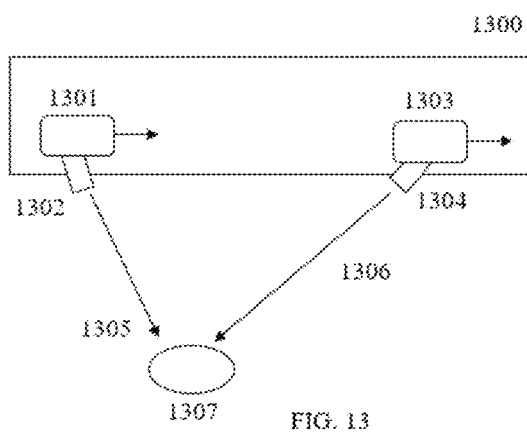
FIGS. 13 and 14 illustrate in diagram image object tracking in accordance with an aspect of the present invention.

In accordance with a further aspect of the present invention a multi-camera system as provided herein is constructed and provided to track a space in point. For instance a camera system may be moving, experiencing at least uncontrolled yaw and pitch relative to a recorded space and a deliberate moving of the camera system relative to the to be recorded space. For instance, as illustrated in FIG. 13 a user in a moving car on a road 1300 wants to record a video of a static object 1307. The car is moving and is in a first position 1301 at a first moment and a second position 1303 in a second moment and a camera in a first position 1302 has pointing direction 1305 at the first moment and has position 1304 in the second moment directed in direction 1306 at object 1307 which may be static.

A potential disadvantage of recording a video image like that in a moving car is that keeping the object inside a center of a field of view of a handheld camera is difficult. As the car is moving the camera has to be rotated to stay directed on 1307. Furthermore the road may be bumpy causing a camera to pitch while inaccurate turning by a user may cause the camera to lose the object from its center of focus. However, with a camera system as provided earlier a multi-camera system may have an active field of view of 150 to 180 degrees or greater in horizontal and/or vertical direction or at least so large that the object remains inside the field of view of the multi-camera system even though the object is not at its center.

The object or space 1307 has one or more geospatial coordinates. Those may be public geospatial coordinates such as GPS (global positioning system) coordinates or any other coordinate system that determines coordinates of an object or space relative to a position and/or pose of a camera. Preferably such as coordinate system provides a 3-dimensional positioning in a coordinate system. For illustrative purposes a GPS system with altitude determination is assumed. However, the following aspects apply to any 3D positioning system.

In one embodiment of the present invention, a GPS system that is preferably part of the camera system 1302, as is commonly the case in smartphones, determines at least 2D and preferably 3D coordinates of camera system 1302. Furthermore, inertial sensors and one or more magnetometer sensors determine a pose of camera system 1302 directed in direction 1305 to object or space 1307. A distance from 1302 to 1307 is determined by system 1302. This may be done in several ways. A distance may be determined by a setting of an autofocus system in 1302. For far away objects a large enough minimum distance may be assumed. For instance a distance of 100 meter. In another embodiment a distance may be determined by one of several publicly available smartphone apps. This may be based on triangulation using a prior position of 1301, on a known or estimated height of 1302 and/or 1307, on a known or estimated position of 1307, for instance in a GPS map, or a manually or menu entered distance of 1307. Simple geometry and surveying rules may be applied to compute or estimate at least the 2D coordinates, such as GPS coordinates, of 1307.

Another way to determine a distance is by having access to GPS coordinates of an object. This may be from a map or websites like Google Maps. Additionally many GPS mapping apps for smartphones are known and available. This allows a system to be located at objects and or spaces and to record and label the GPS coordinates of a location, object or space. These locations are then available to a system 1302. For instance, one may want to survey objects and/or spaces on a route that is travelled. The coordinates of these locations may be visited and recorded during a prior visit or downloaded or obtained from available resources, including an on-line server. It is noted that an error in location by estimating a distance, when the distance is greater than 100 meter or 200 meter may be negligible for the current purposes. In that case an inaccurate estimation by a distance measuring app may be sufficient for determining GPS coordinates of the object or space.

A problem of finding GPS coordinates, if required, may be reduced to finding terminal coordinates given initial coordinates bearing and distance. Computer programs to perform such a computation are available on-line and easy to use and/or implement. Given a desire to take images over visible distances, accuracy for distances over 100 meter but less than for instance 2500 meter are not a problem.

Preferably a user places 1307 in a center of camera system 1302, while coordinate position of 1302 and pose angles are stored in memory; and GPS position of 1307 is computed and stored. A preferred pose of the camera system is now in the coordinate directions of 1305.

In one condition, the camera system is substantially static. A user may move while still recording images of object 1307. In that case the camera-system with its multi-camera application has a broad field of vision. Even if the camera system is moving due to shake or other user movement, the image of 1307 is still within the projective or image space of the camera system as illustrated in FIG. 10, understanding that for illustrative explanation the image space has been extended in horizontal direction, but that extension in vertical space is also fully contemplated. As taught before above, a relative pointing direction, that is relative to a center pointing direction, the image space or pixel positions in an image space are corresponding to a relative pointing angle. Again as example a relative pointing angle of −55 degrees corresponds to pixel 400 in an image as recorded by an active area 908 of an image sensor. For convenience, the relationship in FIG. 10 is shown as being linear. Other non-linear relationships between image space and pointing directions are possible and fully contemplated. These relationships may be determined during a calibration and provided in a memory to be applied during actual use to determine a window of pixels to display an image corresponding to a relative viewing direction.

Using current inertial and other sensors in a camera-system such as a smartphone, allows to determine a deviation of a pointing direction from an initial pointing (center) direction. This is illustrated for horizontally extended panoramic images. The camera system has at least 3 cameras with corresponding active image sensor areas 1401, 1402 and 1403 that creates an optical space of image sensor combination 1400 and a corresponding image space of a panoramic image. One may consider constructing the panoramic image from a central point 1406. The camera looking directly to a center point 1404 focused on an object records an absolute pointing direction 1408 in active area 1402. Moving the camera keeps the object within the field of vision of the panoramic system. But now the image center has moved to position 1405 in active area 1401. Assuming that the object has not moved and the camera system has rotated around an axis, the object still has the pose recorded as 1408, but the object appears to be in position 1409. While the image appears to have rotated left from 1408 to 1409, the camera has actually rotated right determined by the angle between pointing direction 1408 and 1409. To construct the correct image, one has to use the pixels in 1401 determined from FIG. 10 from the negative rotation of the neutral position of the camera to the new position as determined by the inertial sensors, for instance. So if the camera has a yaw of 17 degrees right, one has to look for image data by rotation of the calibration space of 17 degrees left.

A user may set a size of an extracted image 1405 as a window size. As default an image size may correspond to a screen size. However, a user may create a size of a window for instance by expanding or diminishing a size of a rectangle on a touch screen.

A multi-camera system as taught herein may have enabled a preferred recording position or recording pose and extract an image corresponding to that preferred pose even when the center of the system is not pointed in the preferred direction or pose. A user may switch off the system or walk away, with the system active, or may go to a new location. Anyway, a system may activated to recall a preferred location of an object, and/or a preferred pose or pointing direction of the camera system. A processor of the system may determine new coordinates of a system's location and based on the previous location and/or pose and/or a known or estimated position of the object determine one or both of 1) the required pose of the camera system to capture the object in the new location; 2) if a current pose of the camera system places the desired object within a field of view of the camera system and 3) provides guidance, for instance with visual markers on a screen, how to move the camera system to place the object within the field of view of the camera system. In one embodiment of the present invention an object may have a GPS or location device that provides location coordinates, including an altitude to the camera system, preferably through a wireless connection. This enable a camera system as disclosed herein to compute a pose that places the object in it field of view. It is not needed to center the camera system on the object. A marker, like a circle or a rectangle or other icon or shape, may change color indicating if an object is inside a field of view. For instance a shape like a rectangle may be red when an object is outside a field of view, turn orange when closer to field of view but still outside, blue turning green when the object is inside a field of view and is moved to a center. This approach is beneficial when an object's location is known but for some reason not visible, obscured by another object, hard to recognize because of size, or is lost for recognition in a plurality of objects.

Figure 14:
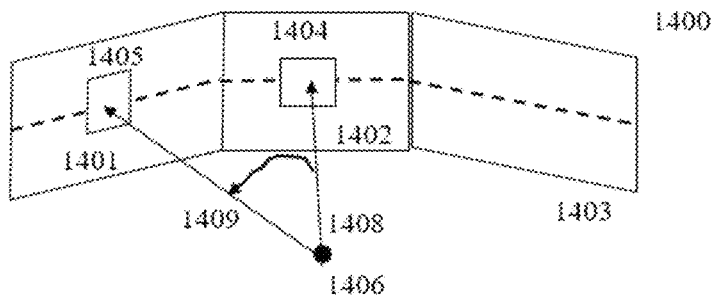

This illustrates how with a panoramic active area image sensor construction and a calibration method one may reconstruct the correct image of an object on a screen smaller than the total panoramic image. As long one keeps an object sufficiently within a field of view of the panoramic camera, one may reconstruct a smaller but correct image of an object even with substantial movement of the camera system. One is reminded that image overlap is just that, image overlap. Not sensor overlap. A figure like FIG. 14 is merely a representation of a physical situation. One may also extend images in vertical direction. And apply a similar approach. Furthermore, certain distortion may be diminished by using curved image sensors instead of flat image sensors. Curved image sensors are taught in Guenter et al. Highly curved image sensors: a practical approach for improved optical performance, https://doi.org/10.1364/OE.25.013010 which is incorporated herein by reference. Sony Corporation has been cited to produce curved image sensors.

Accordingly, once a neutral pointing direction of a camera to an object has been recorded, any new pointing position may be recorded. A deviation may be determined from the neutral pointing direction and an image area corresponding to a correct image of the object still within the field of view of the camera system may be determined based on the measured rotation, even as the object is no longer in the direction of the neutral position.

This is already a very powerful application of panoramic imaging and an example of a digital gimbal. In a further aspect of the present invention the camera system is moving as illustrated in FIG. 9. A GPS location of object 1307 is recorded together with a GPS location of camera system 1302. The car 1301 has moved and may be in position 1303. The camera system now is treated as a new system 1304. That is, it should point in direction 1306 at 1307 to capture the image of 1307 in its center. Most likely it will not. However, a location of 1307 either estimated, recorded or retrieved is available to a processor. Furthermore, location coordinates of the system in 1303, including altitude, are available, for instance from a GPS device attached or part of the camera system. Based on location data of 1304 and 1307, including altitude, simple geometric computation allows the processor to compute a pose or attitude 1306 of the camera system to point centered at 1307 from 1303 by 1304. The inertial system provides a true pointing direction of the camera system and computes, as before, the deviation of the true pointing direction from the actual pose of the camera system. The deviation, again as before, applied to an actual image space as illustrated in FIG. 10 and FIG. 14, determines for a processor to find the correct image or pixels of a predefined size that displays an image of the object even when the camera system in not centered on the object.

A multi-camera system as disclosed herein generates a panoramic image and a video image at a speed of at least 10 frames per second. One may apply different processing strategies to improve the speed of processing the entire image. However, the fact remains that a full frame panoramic image is available at least 100 ms at at least 10 fps. Assume that a panoramic image has h(=height) by w(=width) pixels. A single extracted image is preferably of size he (=extracted height) and we(=extracted width). Herein at least we<w and preferably we is substantially smaller than w, preferably we is at most 60% of w, preferably we is at most 50% of w and even more preferably we is less than 50% of w, and even more preferably we is at most 33% of w and even more preferably we is at most 25%. One likely scenario is where there are at least 3 cameras in a row with active image sensor areas that create overlap images. Assuming that the overlap is about 10% as example, we get a total width of a panoramic image that is 2.6 times a size of a standard single camera image. We may use a window that is 100% of a size of a standard image. Assume a number of pixels on a row of a panoramic image running from 1 to 2.6*ws with ws the width of a standard single image. Then the center of such a window can be at 0.5*ws at the left size to 2.1*ws at the right and still capture a full width image.

During a calibration step, the x-coordinates (or row coordinates) of a row of pixels, which may be a center row, of a generated panoramic image is correlated with a relative pointing direction of a panoramic camera. In that case a center focus is 0 degrees and is associated with center image is 1.3*ws if the starting position of the count is 1. By using an object with a clearly defined center one may determine a rotation of a camera system to the right that leaves a standard extractable image on the left of the panoramic image with the object image center located at 0.5*ws and record the actual rotation of the camera related to its recorded center position. And do the same with a left rotation placing a static object in an ultimate right position in the panoramic image.

Extracting an image includes determining a relative rotation, finding the x-position of the center 'xc' from the calibration, for instance in a stored calibration table and extract a full height image with size ranging from xc−0.5*ws to xc+0.5*ws. A similar approach may be applied to the vertical or y direction. Assuming a panoramic image size of w by h pixels and with 3 rows of 3 cameras, each with an illustrative loss of 10% required overlap will give a height of h=2.6*hs with hs is a standard size image height and w=2.6*ws. A calibration step would also include a vertical calibration for a pitch of a camera system. Again, an extraction would include determining a pitch rotation and a yaw or pan rotation relative to a standard center position, followed by a lookup of a center position of an extracted image based on measured rotation (suppose xc,yc) and extract from the panoramic image data the pixels in x range [xc−0.5*ws, xc+0.5*ws] and [yc−0.5*hs, yc+0.5*hs] with the origin being at the bottom, left side of the panoramic image.

Extraction is thus merely reading a defined portion of image data, after a panoramic image has been generated. The above lends itself to different time saving processing strategies. For instance, it is known which parts of a panoramic image have to be processed. For instance, when an extracted image in a 3 by 3 multi-camera system is in the left part and upper two camera areas, it is not really necessary to process image data of active areas of image data that do not contribute to the extracted images. Most of the processing, for instance of entire active areas, based on established parameters, such as warping and color correction, may take place in parallel and so little or no time may be gained. But for instance, an entire image has to be demosaiced to generate an image. The ability to limit the number of processing steps by a single processor, when not done in parallel by multiple processors or processor cores, may be applied to shorten the time for image processing. For instance one may push the processing for warping operations or color correction to a stage wherein the actual size and location and thus the image data has been determined and processing of image data, preferably prior to demosaicing, is pushed back to a stage wherein fewer data elements have to be processed.

Accordingly, a wide field-of-view of a panoramic camera system allows a camera system to be generally pointed in a direction of an object without capturing it directly in its center and still create an image, which preferably is a stable image, of the object. Thus the herein provided multi-camera system including its calibrated mapping, based on an actually measured actual pointing direction relative to a required pointing direction, to corresponding pixels in an image space, works as a digital gimbal, without the required motorized elements of a mechanical gimbal.

Roll compensation relative to a horizon may be done by processing steps, including a resizing of the roll corrected image to a required base size. It may be preferable to first compute the compensated position in the panoramic image or extended image space and compensate only the image inside the e-gimbal window. This requires a much smaller set of data to be processed, limited only to the e-gimbal window size. A simple intermediate solution is to use a mechanical roll-compensation for a platform of the multiple cameras. Presumably only a limited maximum expected roll has to be compensated. For instance likely not more than 10 degrees or up to 15 degrees. Such roll stabilization (or OIS) is known and may be an acceptable solution if one is limited in processing power.

One objective in accordance with one or more aspects of the present invention is to achieve image stabilization of a moving camera that may or may not record a moving scene or object, by digital processing instructions as much as possible. Camera roll in that regard may be a bit of a challenge. A reason being that large angle roll (roll being rotation around the pointing direction of the camera, or in other words rotation of the horizon in an image) may need computationally expensive homography. Large angle rotation in a standard camera may require cropping of the image as the diagonal of an upright image may be rotated, requiring cropping of the image sides. Fortunately, cropping is not necessary if one uses an extended image space as explained herein. However, one needs to determine a display window size in rotated state or a modification thereof, so that the homography of the window creates a sufficiently sized image.

One approach may be to find a center of the desired e-gimbal window, based on the determined panning and/or pitch angle and create a homography window of sufficient size around the center of the image with roll. Perform the homography to correct the roll angle and then cut out the desired display window around the center. One may also perform a correcting homography on the entire rolled extended image space and then do a correction for pitch and pan. However, this requires a homography on many more pixels and a computation of the coordinates of relevant pixels to determine an e-gimbal window.

Fortunately, common use of a camera (not for extreme sports or shaky, uncontrolled movement in any direction) is usually limited to a roll of 10 degrees max at a frequency that is less than 10 Hz. OIS for instance generally works within a roll of 5 degrees. Small angle rolls offer the possibility computationally fast operations. For instance, a small angle roll may be addressed by a correction of the scanlines of rows of pixels. That is, a small roll angle may be countered by having the scanline jump up 1 pixel for horizontal move of 5 pixels. These and other adjustments in scan angle may be preprogrammed in scanline instructions. Especially when conducted on raw image data, subsequent demosaicing with blending and interpolation will create a high quality image without the need for homography.

The above correction of limited roll by adjusting a scanline pattern in a way how physical pixel cells are read, harvested or read, may be called "scanline jumping." In general physical pixel cells are read or harvested in rows. In accordance with an aspect of the present invention, depending on a roll angle, a row of pixel cells is for instance read from active area position 1 to 10 as a row, However, the scanning continues then with the following 10 pixel cells of the row above (or below) the current line. A read or harvested line, then looks like a staircase that may be described as a line with angle alpha approaching tan (alpha) $=\frac{1}{10}=0.1$ which conforms with an angle of about 5 degrees. One may go up tp "scanline jumping" to about 1 in 6 or 1 in 7 or realizing an approximation of a scanline angle of about 10 degrees. Especially with the pixel density of modern image sensors, the interpolation that is part of demosaicing of pixel cells (or Bayer cells) will create a high quality image with close to undetectable, staircasing or aliasing as one sometimes sees in low resolution pixelated images.

One may create simple "scanline jumping" scenarios, by implementing the correct parameters in for instance a table that is accessed based on a camera roll angle or roll angle change measured by a positional or pose or inertial sensor part of an Inertial Measurement Unit (IMU) on a smartphone, for instance. Commonly, "normal" camera users (not in extreme moving conditions) appear to be able to maintain camera (or smartphone roll) well between plus and minus 10 degrees, which is still a max. rotation of 20 degrees. Thus the "scanline jumping" as provided herein may be extremely fast and suffice for most roll situations. Image sensor manufacturers may offer development tools that allow random access to addressed pixel cells. Executing specific reading rules may slightly increase access time. However the benefits of using "scanline jumping" for smaller roll angles, for instance 10 degrees or less may outweigh the slightly longer access time.

Preferably one determines different appropriate "scanning jumping" rules for different roll angles and store them in a table or the like on a memory for instance and addressable based on a measured roll angle. For roll angles greater than a threshold, one may apply an appropriate correcting homography of which parameters are also stored and accessible based on a measured roll angle.

Despite the above simplification, it is known that real-time homography of 4K images at 60 frames per second may be achieved with for instance dedicated processors such Graphic Processing Units (GPUs). If so desired one may actually divide an image in sections, perform the corrective homography section wise and merge the homography treated sections again in one image. If one runs into computational constraints by large roll angles, one may instruct a processor to reduce the processing frame rate. The reduction of the frame rate (for instance by downsampling or frame skipping) one may create sufficient time for processing and only marginally diminishing output quality.

An Optimized Roll Stabilization may include: 1) Small Roll Angles: For minor roll adjustments (e.g., within ±5 degrees), one may use a simple scanline interpolation method. Example: For a roll angle of 2 degrees, one might adjust each scanline by moving 1 pixel up for every 5 pixels horizontally. This creates a smooth correction with minimal processing. 2) Moderate Roll Angles: For moderate roll angles (e.g., 5-10 degrees), one may use a more refined interpolation method. Example: For a roll angle of 7 degrees, one might adjust each scanline by moving 2 pixels up for every 5 pixels horizontally. This provides a more precise correction while still being computationally efficient. 3) Large Roll Angles: For larger roll angles (e.g., above 10 degrees), one might need to combine scanline interpolation with homography transformations. Example: For a roll angle of 15 degrees, one could start with a scanline adjustment (e.g., 3 pixels up for every 5 pixels horizontally) and then apply a homography transformation to fine-tune the correction.

Step-by-Step Approach Collection of Roll Corrections: Interpolation: For small roll angles (e.g., 0.01 to 2 degrees), simple interpolation methods may be used to adjust the image with minimal computational load. Scanline Jumps: For moderate roll angles (e.g., 2 to 5 degrees), one may use scanline jumps, such as moving 1 pixel up for every 5 pixels horizontally. Homographies: For larger roll angles (e.g., 5 to 10 degrees), apply homography transformations every few frames (e.g., every 5 frames) to create a new baseline. Labeling Best Approaches: Label each correction method for specific roll angles, creating a comprehensive dataset that covers angles from 0.01 to 10 degrees in incremental steps. Training a CNN: Train a Convolutional Neural Network (CNN) on the labeled data. The CNN will learn to select the best correction method for each roll angle based on the training data. The CNN can be designed to operate in real-time, making quick decisions on the appropriate correction method. Using GPUs: If GPUs are available, leverage their parallel processing capabilities to handle the computational load of homographies and other complex transformations. GPUs can significantly speed up the processing, allowing for real-time stabilization even for larger roll angles. One may rely on the trained CNN to manage the roll stabilization. Implement a strategy to lower the frame rate when the rotation angle is too large, reducing the computational load and ensuring smooth performance. Adaptive Frame Rate: When approaching a roll angle that supersedes a threshold, lowering the frame rate during large rotations can help manage the computational load without sacrificing too much video quality.

Applying artificial neural networks in image stabilization in combination with IMU sensors is known. For instance U.S. patent application Ser. No. 16/120,037 filed on 31 Aug. 2018 to Kang et al., published on Mar. 5, 2020 and which is incorporated herein by reference teaches machine-learning using inputs from IMU sensors and applying a neural network to predict counteracting motions. Similarly, U.S. patent application Ser. No. 18/256,587 to Shi et al. PCT filed on Dec. 10, 2020 which is incorporated herein by reference teaches a Deep Neural Network to learn rotation and translation of a camera and to provide correcting warping.

For roll correction one may distinguish the following situations. In one example a center or neutral point that determines a pointing direction of the camera system is pointed at an object or scene and a menu item or button on the camera system is activated, thus setting the pose of the camera system as determined by inertial sensors, and/or compass, and/or GPS and others that are available as the instant starting direction. The positional sensors then determine any rotation (roll, pan, pitch) of the camera relative to the initial pose or pointing direction. The processor then finds a point in the extended image space (which is now possibly roll rotated) that conforms with a translation equivalent to a panning and pitching angle being the negative or inverse direction of the measured pan and pitch. This is equivalent center point and a window which may be rectangular, equivalent to a size of a to be displayed may be applied to rotate back equivalent to the roll angle, creating image data of the scene or object. This captures an image that is substantially stable of a static scene, with a moving or rotating camera that includes roll. When the camera system itself is moving in a translation, the processor may compute an updated neutral pointing direction. This process may be simplified by using the camera system in different positions and using for instance the included GPS to determine by triangulation the GPS position of the object or scene. This allows the processor to update the neutral pointing direction towards the object or scene and use the updated neutral pointing direction for the steps as provided herein.

An advantage of the above e-gimbal approach is that there needs not to be a detectable object at the pointing direction, as the set (and updated) pointing direction and the measured rotation angles determine the e-gimbal window.

Furthermore, one does not require to un-roll the entire extended image space. Based on measured rotation angles one may compute a center of a desired window in rotated form, define a rotated window that after un-rotation has a desired display size and only un-roll the image data in the rotated window.

In yet another embodiment of the present invention. as explained herein, an object is detected and tracked in the extended image space. A center of a detected and tracked object may be mapped to an (x,y) coordinate in the expended image space and a pre-defined sized window may capture the image data inside the pre-set window. With detected roll, the window size is defined as being corrected for roll. To illustrate this, assume that the camera viewing a horizon has roll of 10 degrees clockwise viewing in the direction of the horizon. That means that the actual image when viewed in standard mode shows a horizon that has an upward angle of 10 degrees. Thus one needs to construct a rectangular window that is preferably slightly bigger than the display picture with sides parallel (and perpendicular) to the horizon and create a homography of a 10 degrees downward to create a correct "roll corrected" image. This method has as advantage that as long as the object is tracked within the field-of-view of the camera system, an (x,y) position of the center of the object may be determined and the required steps include creating a window size to capture the image data and use the sensor measured roll to correct roll.

The required pointing direction in one embodiment is an initially set pointing direction, determined for instance by centering a camera on an object or space and recording the pointing direction or pose as the required pointing direction. In such a case a required pointing direction is invariant until it is changed. In one different embodiment a pointing direction is determined and for instance computed from actual coordinates of a space or object. In that case, when the camera system moves, the coordinates of the object may remain constant and based on actual positions of the camera system, the required pointing directed is recalculated, for instance at regular intervals. In yet a further embodiment an object may be moving that is being recorded by a panoramic camera system. Also in that case an actual pointing direction has to be recomputed. There are several ways to recalculate the required pointing direction. For instance an object tracking application may be applied. At the beginning of an image recording, an object is centered on the camera system, the actual position of the object is determined as well as the required pointing direction. The object is tracked in the image space of active areas of the image sensors. The object image may be found with its center at 1405 in image 1400 of FIG. 14. The image 1405 may be extracted and displayed on a screen. A reverse determination of actual position relative using the calibration as illustrated in FIG. 10 is applied. This provides a deviation of an actual pointing direction of the camera system and hence a processor can determine an actual deviation in rotation angle based on the movement of the object. In a further embodiment a user may hold the camera system in a constant pose, while the system tracks and displays the object. A processor may estimate, based on rotation speed, a future position of a moving object, making image location in image space more predictable for a processor.

One form of tracking is to center the camera on an object and move with or around the object. Object tracking in an image is well understood and enabled. Image tracking may be done for instance with the earlier recited OpenCV software or with commercially available tracking software. The software finds in the image the tracked object and its location in the image and extracts a displayable image of a predefined window size from the total multi-camera image to be displayed on a screen.

In accordance with an aspect of the present invention, the extracted image may be of a size slightly bigger than the displayed image. The excess pixels may be used to apply EIS to the extracted image. Again OpenCV or other software may be applied to stabilize an extracted image. Similarly, in forming the extended image space or panoramic image one may store or sample image data in overlap regions that would be ignored or deleted in the actual contiguous panoramic image. This extra data may be used in quality control and adjustment, such as detection of active area borders, image intensity blending and the like.

Mechanical gimbals are often applied to create cinematographic images, such a reveal, push-in, pull-out, panning and follow, which may all be performed with the digital gimbal as taught herein. For many "working" applications, such as surveillance and body-cameras, cinematographic effects are not as important as to get a stable and accurate image of "what is taking place." In some cases such as real-time surveillance, real-time display is important. In other applications such a body-cameras it is important to be able to reconstruct and view an image on an object, space or subject, as to what is taken place. In that case it may be more important to record a scene with a multicamera video system, but fully reconstruct an appropriate image of a part of a scene later off-line. In that case real-time recording may be more important than real-time display. In consumer products a real-time or at least quasi real-time display is required. Depending on available on-system processing resources, a system may generate a fully digital gimbal stabilized real-time image. If on-system processing is limited a system may generate a sampled real-time image, for instance based on a limited number of pixels. For instance a processor may only use one in 4 or even fewer of available pixels of an HD image to process by the digital gimbal. And process a at a low frame-per-second video presentation. For instance a HD video may have 120 frames-per-second, but the real-time system processes only one in every 12 frames, generating a 10 frames per second resulting video image. While strictly speaking of a lower quality, it may be more than adequate for real-time review and allows on-system processing resources to create the required review image to be displayed in what is still considered herein as being real-time.

In accordance with an aspect of the present invention a local position and pose of a camera system is recorded. Also, coordinates, estimated, computed or otherwise obtained from a space or object that is associated with the coordinate system location and pose may be retrievably be stored in a memory. A camera system records an image of the object or space. It may be that through movement of the camera or otherwise the object is not in the center of capture of the camera-system. As explained earlier herein, actual coordinates of the object are available and are stored or may be computed and stored on the system. A user may switch off the system or move the camera system while not being directed at or with the object in a field-of-view of the camera system. A user may actually leave the area of recording with the camera system and come back later in the same area, but not necessarily in the same spot, to continue recording of the object or space as determined and stored previously. The camera system may be activated and the location/coordinates of the object may be recalled. Based on actual current location coordinates, including an altitude, the camera system may compute, using known geodesic geometric computations, the required pose of the camera system to direct a center of the camera system at the retrieved coordinates of the object. A display on a screen of the camera system may guide a user to point the camera system in the required pointing direction. For instance by displaying arrows on a screen and showing an appropriate icon an the screen when the camera system is appropriately positioned and directed. This approach allows a camera to be correctly pointed by a user at the same object even when the camera system has been moved.

In accordance with an aspect of the present invention a warning system provides an alert when the camera system is close to longer being able to generate a required size image of an object. This happens when the center of the system nears an edge of a multi-camera system close to about half a preset image display size. When the center is less than half a preset image display size from an edge, generation of a full size required image size is no longer possible. FIG. 10 illustrates where these alarms may be set. Preferable actuators, like vibrators may be placed on the sides of a body of a handheld camera-system. When the to be extracted image gets too close to an edge by camera body movement, a vibration alerts a user for instance to move away from the side that is vibrating.

It may be beneficial to hold the camera system on an extension or selfie stick. In that case a functional connection, either wired or wireless, via Bluetooth for instance, is made between controls on the extension stick and the camera system, so that the controls of the camera system can be activated by controls of the extension, or extension stick or selfie stick. Such a control include a switch or control switching off or on of a display on the camera system. This allows to raise a camera in the air, without revealing a lighted screen for people behind or in front of the camera system.

In accordance with one embodiment off the present invention, a multi-camera system has at least two cameras overlapping along one axis. For instance two cameras are overlapping in a horizontal direction to create a horizontal panoramic image. For convenience this is assumed to be a minimum configuration in accordance with one or more aspects of the present invention. If one turns the camera, the extension of course becomes a vertical extension. Without further express designation a camera extension or a first extension is assumed to be a horizontal extension. One may have 3 or more horizontal extensions. For instance as illustrated in FIG. 10 and FIG. 14. One may also add vertical extensions. A minimum fully horizontal/vertical extended multi-camera system is a 2 by 2 multi-camera system. One is again reminded that the images generated by these cameras should have appropriate overlap. This of course does not mean that the actual image sensors have overlap. Another multi-camera system may be 2 rows of 3 horizontal cameras and a 3 rows of 3 horizontal cameras. One may indicate such a camera system as a k by n multicamera system with k rows of n cameras.

In accordance with an aspect of the present system a hybrid digital gimbal is provided, wherein for instance only one row of n cameras is used to generate a horizontal panoramic image. A mechanical gimbal that holds such a cameras system then still has one or more motors to mechanically control a pitch of a camera system and/or a rotation of a camera. Such a hybrid camera may be a transitional system from a completely mechanical to completely digital gimbal.

In one embodiment a screen 902 as in FIG. 9 show a full screen corresponding to a size of an image generated by a single camera. In another embodiment, the screen displays a panoramic image, In both cases the screen shows a target circle 904 that corresponds with the actual orientation of the body of the camera system. When a control is activated, the position/orientation/attitude of the camera system is stored. Based on for instance a focus setting of a camera focused at the object a distance between camera system and object is determined and stored in memory.

The herein provided digital gimbal works for almost all multi-camera systems. However, the higher a resolution of a screen, the more frames per second and the higher a number of color shades are used, the more processing power is required. This may require that systems that have limited processing power, lower quality images are used to generate panoramic video images. For instance the simplest low processor power system, may process 3 512 by 512 grayscale images. This does not mean that individual cameras have to be local quality. In panoramic mode a system may sample high quality color images to 512 by 512 grayscale images at 10 fps as a simple pre-processing step. This dramatically reduces the need for high power processing. In the alternative, a processing pack may be used that has optimized processors and processor cores or customized FPGAs for processing. Active areas are already predetermined and the active sensor are parameters are provided to the processing pack with all image data, or preferably, only the image data harvested from active image sensor areas are provided to the processing pack which will perform all the steps to generate a correct panoramic video. The camera system may also provide pointing directions and calibration data to the processor pack, allowing the pack to perform digital gimbal processing and extract the required video images from the multi-camera panoramic video stream and display it on a display screen.

Figure 15:
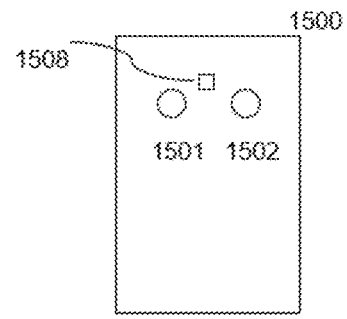
FIG. 15 illustrates in diagram a multi-camera system in accordance with one or more aspect of the present invention.

FIG. 15 shows in diagram a camera 1500 having at least two lens/sensor units 1501 and 1502. A lens/sensor unit contains a lens that corresponds to an image sensor and the image sensor enabled to generate a plurality of signals generated by picture elements on the sensors.

An image sensor is associated with a lens. A lens may be combined with a sensor in a housing. The combination of a lens with its associated sensor is called a lens/sensor unit. A lens in one embodiment of the present invention is a fixed focus lens. In a further embodiment of the present invention a lens has a focus mechanism. A focus mechanism can be a manual focus mechanism, for instance by rotating the lens. In yet a further embodiment of the present invention, a lens has an auto-focus mechanism. Part of an autofocus-mechanism can be a distance sensor 1508 as illustrated in FIG. 15.

In one embodiment of the present invention the at least two lens/sensor units are used to create a panoramic image of a scene. In that case there may be more than two lens/sensor units and the camera of FIG. 15 is called a panoramic camera.

During a calibration an active area of an image sensor can be defined, the active area being smaller than the actual pixel area of the sensor. Pixels are generally read in horizontal lines, called scan lines. A sensor can also be read in not horizontal lines, vertical lines, slanted lines or in a pseudo-random pattern. The sensor data can be stored in a memory. In accordance with an aspect of the present invention a processor processes only pixels or pixel data related to an active area of an image sensor. In one embodiment of the present invention a memory only stores pixels from an active sensor area. In a further embodiment of the present invention a part of the memory is defined that only stores pixels generated by an active area of a sensor. In a further embodiment of the present invention a processor s instructed to read and/or process only data from memory related to an active sensor area. In an embodiment of the present invention a processor is instructed to process data depending on its position in a sensor with regards to the active sensor area.

Figure 16:
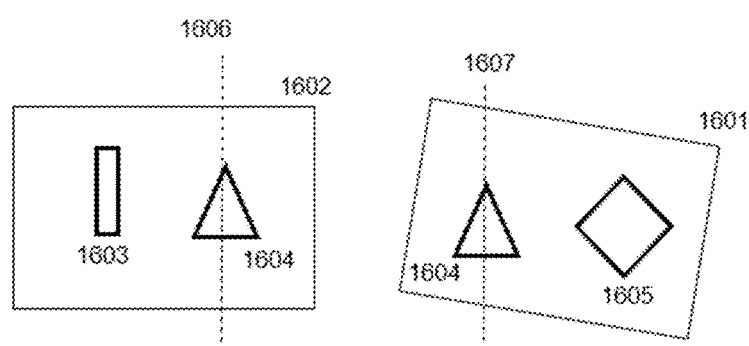
FIGS. 16 and 17 illustrate in diagram active areas of image sensors in accordance with one or more aspects of the present invention.

It is known that more than 2 lens/sensor units may be applied to generate a panoramic image. For instance 3 or more lens/sensor units may be applied. To keep the explanation simple only 2 lens/sensor units 1601 and 1602 are shown in FIG. 16. It is to be understood that multiple rows of two or more cameras are fully contemplated. Assume that lens/sensor unit 1601 corresponds to lens 1501 of FIG. 15 and unit 1602 corresponds to lens 1502. In manufacturing it may be somewhat difficult to perfectly align the units 1601 and 1602 along their (usually horizontal) scan lines of the sensors. If one sensor is even slightly rotated compared to the other it will require additional measures to form an aligned panoramic image. However, it is within current manufacturing capabilities to fully align image sensors in a single body camera perfectly. If such alignment the following illustrates steps to achieve alignment.

FIG. 16 shows three objects 1603, 1604 and 1605 in a scene to be recorded by the camera as a panoramic image. The sensors 1601 and 1602 are in transformed positions relative to each other, including a translation and a rotation. In order to create a panoramic image during a calibration step that may include determining a distance of the lens to an object and a setting of a lens and/or the camera, for each of the sensors a merge line 1606 and 1607 is determined. These merge lines help define the active areas of the sensors. An active area of a sensor is the area of pixels that will be used to create and will appear in the panoramic image. The merge lines and thus the active area may change with camera setting and/or distance to objects or other imaging conditions. A merge line is a processing parameter.

Figure 17:
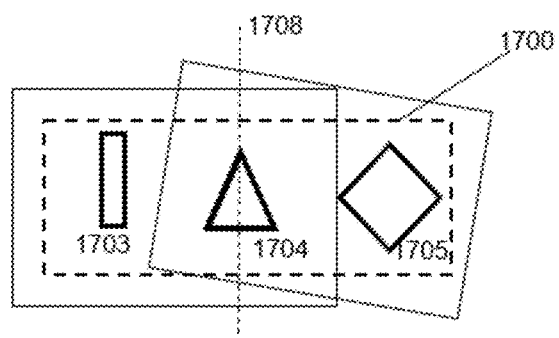

Both sensors have an area of overlap, so when their images are combined along the merge line 1708, as shown in FIG. 17, a panoramic image 1700 is formed. One has to address the rotation before images can be merged. One may adjust for rotation by for instance instructing a processor to read pixels in such a manner that the read pixel lines are aligned. One may also create an adjusted scanning direction based on a measured rotational misalignment. These adjustments including interpolation take place preferably before demosaicing of the raw image data. In one embodiment of the present invention, areas and parameters in image data are defined to perform for instance smoothing and blurring and pixel equalization to create a smooth transition between two active pixel areas. In a further embodiment of the present invention the image data is stored and/or displayed as a panoramic image, or the processed or raw but aligned data is stored in such a manner that a panoramic image is formed by merging two images each created from active sensor areas. (keeping in mind that one may also use three or more lens/sensor units.)

It is known that for most comfortable viewing by a viewer the rotational misalignment should be minimized. The horizontal and vertical alignment can be addresses by reading the appropriate pixel lines at the appropriate starting point. One may calibrate the alignment for different conditions, for instance for different distances, zoom factors, light conditions and the like.

The following 5 patent applications describe aspects of image alignment and calibration for stereoscopic and 3D images and are incorporated by reference herein in their entirety: U.S. patent application Ser. No. 12/435,624 filed on May 5, 2009, U.S. patent application Ser. No. 12/436,874, filed on May 7, 2009, U.S. patent application Ser. No. 12/538,401 filed on Aug. 10, 2009, U.S. patent application Ser. No. 12/634,058 filed on Dec. 9, 2009 and U.S. Provisional Patent Application 61/291,861 filed on Jan. 1, 2010.

Figure 18:
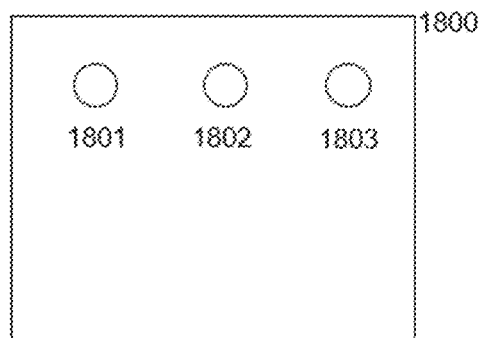
FIGS. 18 and 19 illustrate a multi-camera system in accordance with an embodiment of the present invention.

In accordance with an aspect of the present invention a camera is provided with three lens/sensor units for creating panoramic pictures. This is illustrated in FIG. 18 with lens/sensor units 1801, 1802 and 1803 in camera 1800. In one embodiment of the present invention an autofocus mechanism, including a focus sensor is included. In one embodiment of the present invention the lenses are single focus lenses.

Figure 19:
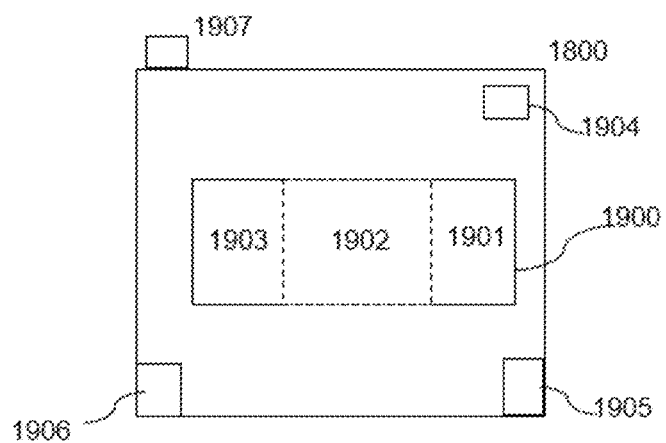

Each of the images generated by these lens/sensor units can be combined to create a panoramic image. The camera may also have more than 3 lens/sensor units, including two or more rows to extend a panoramic view in vertical direction. The units 1801,1802 and 1803 are arranged in a row. One may apply a greater number of lens/sensor units and arrange these in different ways, such as multiple columns or multiple rows. FIG. 19 shows the back side of the camera 1800 with a display screen 1900 which in one embodiment of the present invention is divided in at least three segments 1901, 1902 and 1903. One can select with a button 1904 a first display mode which shows on one segment the complete image of one lens/sensor unit. For instance in the first mode segment 1902 shows the image generated by lens/sensor unit 1802. One may also display the image of other lens/sensor units in a display segment by selecting a display mode, for instance with button 1904.

The camera 1800 contains at least a processor to process image data and to control the settings of the camera and the display screen, wherein the button 1904 for instance can be used to select a display mode. Such a button may take the camera through consecutive modes by pushing it briefly and a mode is selected by holding the button for a longer period of time. The camera also contains memory to store pre-set camera and display settings, which have been entered for instance during a calibration. The camera also contains a memory to store image data. The camera also contains a processor to process the sensor data according to preset settings and the memory can hold the processed image data, which can represent a still image or video images and can be a single lens/sensor unit based image or an image constructed from at least two lens/sensor units. The components such as controller for instance for controlling lens focus, lens aperture and shutter speed, memories, sensor data and image processor are connected internally for instance by a data bus. Such structures are known to one of ordinary skill in the art and are not shown in the figures to prevent obscuring the aspects of the present invention with known matter. Details of an internal processing and communication architecture of a digital camera is disclosed in for instance U.S. Pat. No. 7,676,150 to Nakashima issued on Mar. 9, 2010 and U.S. Pat. No. 7,667,765 to Turley et al. issued on Feb. 23, 2010 which are both incorporated herein by reference.

In a further embodiment of the present invention a control button enables a menu that is displayed on at least a segment of the display, allowing a user to select a mode of display and of taking an image. An image is recorded in a certain mode when the recording is activated by a button, for instance button 1907. In one embodiment of the present invention all images recorded by the sensors are stored and the selected mode determines how the recorded image is displayed. For instance, in one mode only the image taken by the center lens/sensor unit is displayed. In another mode the created panoramic image is displayed.

In one mode the display screen functions as a view finder. The images (either single, or multiple single or panoramic) are shown in that mode, but are not recorded. In another mode the display acts as a view finder and an image is recorded. Often, for instance during performances or during meetings, people take pictures from a scene in front of them. To obtain an unobstructed view for a camera they lift the camera above their head. The display of the camera, acting as a viewer, continues to display the images thus acting as a light for a person on a distance behind the camera. In accordance with an aspect of the present invention a button is provided on the camera that switches off the display while keeping the camera in a recording mode. Such a button in a further embodiment switches the image display to a separate handheld display that shows the image recorded by the camera while the embedded display of the camera is switched off.

In a further mode an image is displayed on the display screen that is not being generated by one of the lens/sensor units but is for instance an archival image that is stored on the camera or that has been made available and transmitted to the display by another device. In one embodiment of the present invention the image is being displayed on the display screen that serves as a background to compare with an image from one or more lens/sensor units of the camera. For this purpose the image may be displayed in a low intensity. It may be enhanced with edges of objects in the image by an edge detector such as a Canny edge detector as is known in the art. The images viewed on the display screen that are provided by one or more of the lens/sensor units may be displayed in a transparent mode that overlays the archival or externally provided image.

In a further embodiment of the present invention one may also extract edges from the current image generated by a lens/sensor unit. Image registration by comparing edges and transformation of images is known. One may apply an image registration as is known to one of ordinary skill to match lens/sensor setting in such a way that the image generated by a lens/sensor optimizes a registration to the background image. Some aspects of using an archival image on a camera to improve an image are known and are described in U.S. Pat. No. 7,616,248 to Parulski et al. issued on Nov. 10, 2009 which is incorporated herein by reference.

The camera 1800 also has an external port to dock to another device. Such a port may be a USB port, which allows the camera to be connected for instance to a computing device such as a computer for exchanging images. The port may also be used to connect the camera to a display having a large display screen to display the images taken by one or more lens/sensor units. The port may also be a wireless port.

In many cases a user may have a computing device such as a mobile phone that has a camera. Such camera may not be enabled to take images in a panoramic mode. The camera 1800 in a further embodiment of the present invention as illustrated in FIG. 19 has a communication port 1906 that communicates directly with a mobile computing device such as a mobile phone. Such a port can be enabled to work in a wired mode. It may also be configured to work in a wireless mode. For instance, the camera may have a port 1906 that is a Bluetooth port that can exchange data with a mobile phone. The mobile phone can provide camera 1800 with an image that serves as an archival image. The camera 1800 in one embodiment of the present invention provides the mobile phone with image data, for instance of a panoramic image. The cell phone may have a different resolution display screen than the camera 1800. In a further embodiment of the present invention images are stored in a high resolution and are downsampled on a device to be displayed in an appropriate resolution on a display screen.

In accordance with a further aspect of the present invention one may import an image that is an image of an object that is segmented from its background. In a further aspect of the present invention the camera has processing capabilities to segment an object from its background. Such image segmentation algorithms are well known and are for instance described in an online lecture notes "Segmentation" by Professor Allan D. Jepson downloaded from <http://www.cs.toronto.edu/~jepson/csc2503/segmentation.pdf> which is dated as Fall 2009 and which is incorporated herein by reference.

In a further embodiment of the present invention control of a camera is provided to the computing device such as cell phone. In yet a further embodiment of the present invention the computing device can open at least one menu on the display screen of the computing device that enables control of the separate camera. This allows a user to be part of an image taken by the camera while retaining control of the camera. In one embodiment of the present invention the display and camera are physically separate and are connected through a wired connection. In a further embodiment of the present invention the display and camera are physically separate and are connected through a wireless connection.

Figure 20:
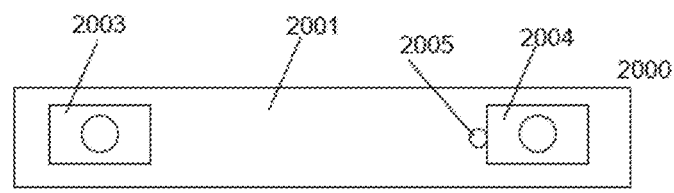
FIGS. 20, 21 and 22 illustrate camera carriers in accordance with one or more aspects of the present invention.

FIG. 20 illustrates another aspect of the present invention. It shows a lens/sensor carrier 2000 with lens/sensor units aligned attached. It was explained above that sensors have to be rotationally aligned to create appropriate panoramic images and to diminish negative effects. One way to assure alignment is to attach at least two lens/sensor units 12003 and 2004 to a rigid carrier material 2001. The lens/sensors units can be aligned during manufacturing and/or assembly of 2000 and should be fixed in their aligned position. Material 2001 should be rigid with negligible bending and distortion over the life-time of the camera. This requires that the carrier will also not be bent or distorted after being assembled into a camera. Alternatively, one may fix at least one lens/sensor unit in an aligned position after the carrier is fixed into the camera. As another alternative, a motor 2005 that can rotate the lens/sensor unit can be included on the carrier 2000. This allows for motor driven alignment of the lens/sensor unit. The motor can be a stepping motor with a mechanism that significantly reduces the rotation angle of the lens/sensor unit per step. Per motor step the rotation of the lens/sensor unit is well below 1 degree in one embodiment of the present invention, and smaller than 1 minute in yet another embodiment of the present invention. A motor may be an actuator such as a piezo-electric actuator. Piezo-electric actuators are available that has a minimum displacement that is below 1 micron, thus allowing rotational displacement of a sensor that is in the single pixel range.

Figure 21:
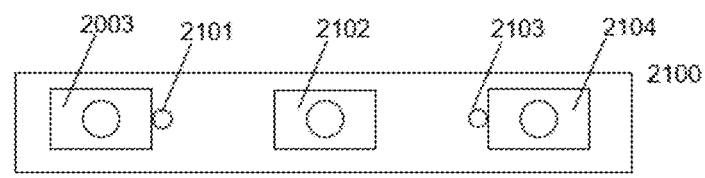

FIG. 21 shows a further embodiment of the present invention of a lens/sensor assembly 2100 with 3 lens/sensor units. Herein an additional lens/senor unit 2102 is provided. Also lens/sensor unit 2003 is provided with a motor or actuator 2101 to allow mechanical alignment of the sensors. A camera 2104 is also shown with rotating motor 2103 to rotate camera 2104.

Figure 22:
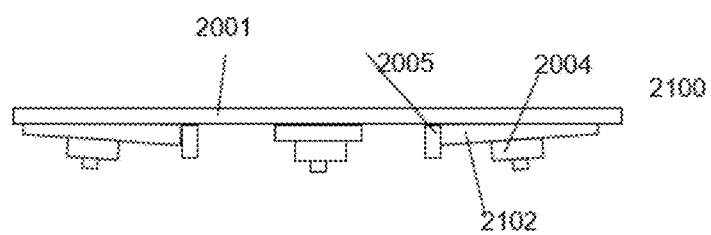

FIGS. 20 and 21 illustrate the carriers 2000 and 2100 in front view. FIG. 22 shows in diagram the carrier 2100 in side view. FIG. 22 shows that the optical axis of 2004 is rotated by a slanted support wedge 2102. The rotation angle effected by the support in one embodiment of the present invention is less than 10 degrees. The rotation angle effected by the support in another embodiment of the present invention is more than 10 degrees but less than 30 degrees. The rotation angle effected by the support in another embodiment of the present invention is more than 30 degrees In yet a further embodiment of the present invention, lens/sensor units may be placed on a carrier and bonded to the carrier in a high precision environment. For instance, at least two sensor units may be accurately placed on the carrier and at least rotationally aligned relative to each other. One can align the sensors in a calibration environment by providing an alignment image and using a mechanical or robotic high precision placement mechanism. After fixing the sensors in at least rotational alignment one may place a lens mechanism over a sensor. In that sense a carrier becomes an integrated panoramic imaging unit that is robust and can be placed in a housing of a camera. Electronic components and communication connection may also be placed on the carrier. The most sensitive stage, which is probably the rotational alignment can take place in a manufacturing or laboratory environment that accommodates this type of high precision positioning and bonding. Such high precision environment is for instance present in semi-conductor processing and is known in semiconductor steppers.

In an additional step one may also provide translational alignment of the sensors or the lens/sensor units.

Once the carrier unit with lens/sensor units fixed in aligned position one may install additional components such as lenses, zoom lenses, auto-focus mechanism, focus mechanism for the lenses if required (when the lenses are not fixed focus lenses, which is also possible in a further embodiment of the present invention) and zoom lenses, aperture setting mechanism, shutter mechanism, light and distance sensors and the like which are all known components in photographic imaging. One may also provide the correct dimensions, fixtures, buttons, controllers, processors, memory and other electronic components on the carrier. In a further embodiment of the present invention the carrier with at least the lens/sensor controllers and supporting electronics and connectors may be in a shape and completeness that allows a camera manufacturer to obtain a complete panoramic unit that can be assembled with housing, buttons and knobs, and a display screen into either a complete panoramic camera.

In a further embodiment of the present invention the carrier may include an external communication link or may be attached to a communication link or device in the housing that allows communication such as the exchange of data, which may be image data or control/instruction data with the outside world, such as a computing device.

Preferably, the calibration steps that were already disclosed as an aspect of the present invention are performed during or right after an initial power up of the electronics on the carrier with the lens/sensor units attached and the settings stored in for instance a memory, such as a ROM memory. If one achieves a reliable level of accuracy and repeatability of creating the carrier with lens/sensor units attached one may skip the actual calibration step for the mass produced carriers, and replace this by downloading the calibration settings from an external memory or implement them in an electronic device on the carrier. The calibration steps are determined from a mother or standard carrier, which may be used to test the performance of mass produced carriers against.

In a further embodiment of the present invention one or more sensors such as accelerometers are attached or part of a system. A system with accelerometers is disclosed in U.S. Pat. No. 7,688,306 to Wehrenberg et al. issued on Mar. 30, 2010 which is incorporated herein by reference. The purpose of the sensors is to determine a position or a change of position of the display. Based on the detected change in position a signal which is associated with the difference of position of the display is generated and is used to control or drive a motor or an actuator in the platform. Positional sensors and positional difference sensors are known and include accelerometers, magnetic sensors, MEMS with mechanical components, gyroscopes such as optical fiber gyroscopes, Hall sensors, inertial sensors, vibrational sensors and any other sensor that can be applied to determine a positional or angular difference or angular rate change or angular velocity or a linear rate change or linear velocity change of the display. These sensors will be called a positional sensor herein. Many of these positional sensors are available in very small formats, for instance integrated on one or more chips, which can easily be fitted inside a body of a system.

In a further embodiment of the present invention the carrier may include an external communication link or may be attached to a communication link or device in the housing that allows communication such as the exchange of data, which may be image data or control/instruction data with the outside world, such as a computing device.

Preferably, the calibration steps that were already disclosed as an aspect of the present invention are performed during or right after an initial power up of the electronics on the carrier with the lens/sensor units attached and the settings stored in for instance a memory, such as a ROM memory. If one achieves a reliable level of accuracy and repeatability of creating the carrier with lens/sensor units attached one may skip the actual calibration step for the mass produced carriers, and replace this by downloading the calibration settings from an external memory or implement them in an electronic device on the carrier. The calibration steps are determined from a mother or standard carrier, which may be used to test the performance of mass produced carriers against.

In a further embodiment of the present invention one or more sensors such as accelerometers are attached or part of a system. A system with accelerometers is disclosed in U.S. Pat. No. 7,688,306 to Wehrenberg et al. issued on Mar. 30, 2010 which is incorporated herein by reference. The purpose of the sensors is to determine a position or a change of position of the display. Based on the detected change in position a signal which is associated with the difference of position of the display is generated and is used to control or drive a motor or an actuator in the platform. Positional sensors and positional difference sensors are known and include accelerometers, magnetic sensors, MEMS with mechanical components, gyroscopes such as optical fiber gyroscopes, Hall sensors, inertial sensors, vibrational sensors and any other sensor that can be applied to determine a positional or angular difference or angular rate change or angular velocity or a linear rate change or linear velocity change of the display. These sensors will be called a positional sensor herein. Many of these positional sensors are available in very small formats, for instance integrated on one or more chips, which can easily be fitted inside a body of a system.

In one embodiment of the present invention two smartphones, or two tablets or a smartphone and a tablet or a smartphone and a laptop or a laptop and a tablet are used in connection. Herein, one device with a camera, for instance the smartphone, is used as a camera, such as a video camera to record an image, such as a video image of a scene. The device with the camera is configured to provide a real-time image of the scene on the screen of the camera containing device. The camera containing device is uniquely connected to the second device which is enabled to also display the image such as video image on its display. This is convenient when the device with the camera is held in a position, for instance above the head of its user, that does not allow to view the image recorded by the camera on the display screen of the camera containing device. A display of the image recorded by the camera on the screen of the camera containing device serves no purpose and may form an annoyance for people who are facing this screen.

In accordance with an aspect of the present invention, a control is provided on the camera containing device that shuts off the display and thus prevents the annoyance of other people. This control may be a hard button on the device or a control element on the touch screen. This control only switches off the display screen, or rather puts it in sleep mode, but leaves at least the camera function in an operational mode, which continues to transfer image data in real-time or substantial real-time to the connected second device which displays the image. In accordance with a further aspect of the present invention. the display screen of the camera containing device is switched off from the connected second device. In accordance with an aspect of the present invention, the second device controls operation of the camera in the first device. That is start/stop and pause of the camera, zoom and all other controls of the camera can be conducted from the second device, preferably from the touch screen on the second device. The display screen of the second device can also be switched off from the screen of the second device while all other functions, such as storing image data and phone functions for instance, stay operational. The display screen of the second device can also be switched off from the screen of the camera containing device while all other functions, such as storing image data and phone functions for instance, stay operational. The switching-off the screen in both devices is preferably a sleep-mode. Touching a screen will lighten up the screen and allow it to function as an active touch screen.

Two computing devices, a first device and a second device, each have a housing that contains equipment to make the devices operational, including a power source such as a battery or a connector that allows the device to be connected to a power source. These devices in one embodiment have an on/off switch that switches on and off power.

In one embodiment, the first device controls functionality of the second device via a connection which may be wired or wireless. The first device has a camera, a display screen, preferably a touch screen and control, which is preferably a control activated on the screen. However, the first device may also have other physical controls, such as buttons and switches. A user may hold the first device with camera in an elevated position, for instance above the user's head or in any other position where it is hard or difficult or undesirable to view the image generated by the camera on the screen of the device. In one embodiment a user may view the image generated by the camera on the first device in real time on a screen on the second device and adjust a position of the first device in a manner so an object that is a target of the camera of the first device is in view of the camera as viewed on the screen of the second device. Preferably control of the first device, including switching on and off of the camera and the switching on-off of the screen of the first device can be done on the second device. The first device is placed in external control mode, allowing the second device to control the first device. Switching off the screen of the first device by the second device does not affect the camera operation. A processor in the first device, recognizing external control, does not switch off the entire first device when receiving an instruction to switch off the screen of the first device from the second device. Receiving a "switching off only the screen of the first device" instruction, received by the first device from the remote second device is applied as a single purpose instruction only.

Figure 23:
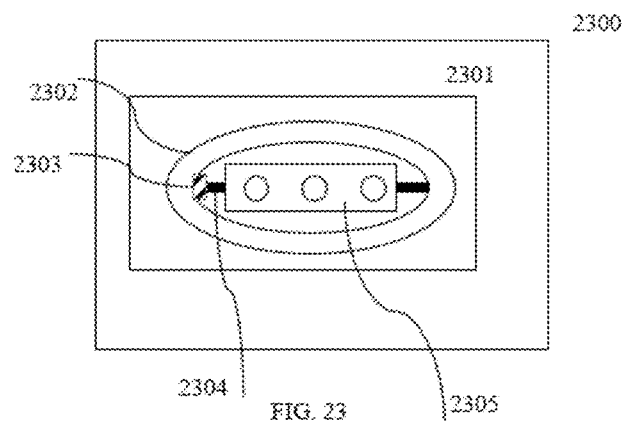
FIGS. 23 and 24 illustrate an internal hybrid digital/mechanical camera gimbal internal to a multi-camera system in accordance with one or more aspects of the present invention.

As taught earlier herein one may apply motors for positional correction of a lens unit as part of a hybrid type mechanical-digital gimbal. In one embodiment motors and movable platforms are integrated in a body of a camera system. This is illustrated in FIG. 23. A multi-camera system has a body 2300, which may be a body of a smartphone. It contains a rotatable camera unit 2301, which is included or attached or integrated in the body 2300. The unit 2301 has a 3 camera platform 2305, for instance as illustrated in FIG. 22 as 2100. The 3-camera unit 2305 may be attached on a rotatable axis 2304, driven for instance by a motor 2303. The motor allows the axis and thus the cameras to be rotated around axis so that the camera platform as viewed at its face from the front are rotated up and down by a processor controlled motor 2303. This structure allows a processor to counter a pitch rotation of the camera system and, for instance, remain a constant pose relative to the horizon. A change in pose of body 2301 may be detected by one or more inertial sensors or accelerometers inside body 2300 and cause a processor to instruct a motor, which may be a micro-stepper motor 2303 to rotate platform 2305 with axis 2304 to counter a measured pitch angle.

In addition to the platform 2305 with axis and motors may be attached to a rotatable platform 2302. This platform is attached to a rotatable axis with a motor which is obscured in the view of FIG. 23 and rotates in the plane of the drawing and thus allows a roll of a the body 2300 to be counters relative to the horizon.

Figure 24:
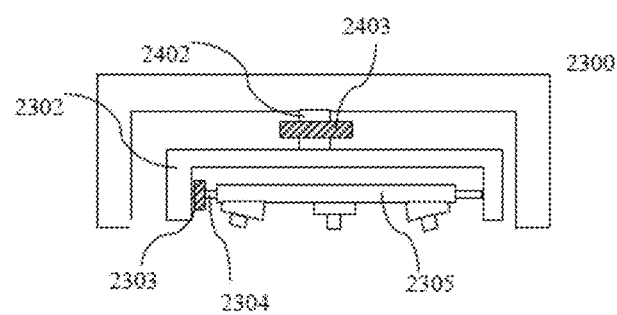

A cross sectional top view of the multi-camera system is provided in FIG. 24. It shows elements of FIG. 23 in a different view. It also shows now axis 2402 and driving motor 2403 that rotates platform 2302 under instructions of a processor to create a roll or a counter roll as desired.

It is to be understood that supporting structures, connectors, bearings, power sources, buses and all other materials required to make the design operational may be assumed even though not shown as to prevent overcrowding the drawing and obscuring the intended design. For instance cameras show no further details or connectors, processor, memories and controls. This is not because they are ignored and thus the devices are not hanging in a structure without context and are expressly not intended to be without context and/or connections. Again, all necessary structures and devices may be assumed and will be recognized to be included by a person of ordinary skill.

A motor may be an actuator such as a piezo-electric actuator. Piezo-electric actuators are available that has a minimum displacement that is below 1 micron, thus allowing rotational displacement of a sensor that is in the single pixel range. For activating mechanisms microactuators may be used. Microactuators are taught in U.S. Pat. No. 10,033,303 to Liu et al. on Jul. 24, 2018 which is incorporated herein by reference. U.S. Pat. No. 9,939,608 to Peng et al. on Apr. 10, 2018 which is incorporated herein by reference teaches small (smaller than 4 mm) voice coil motors. There are many other micro-actuators that will meet the requirements. For instance U.S. Pat. No. 7,355,305 to Nakamura et al. on Apr. 8, 2008, which is incorporated herein by reference, teaches mm size direct acting actuators. An overview of micro-actuators that implement the motors as taught is provided in the article Microactuators-Principles, Applications, Trends by Dr. Ing. Janocha from Saarland University and downloaded on May 14 2019 from http://www.lpa.uni-saarland.de/pdf/a2-1.pdf and which is incorporated herein by reference.

Embodiments of micromotors/microactuators that displace over a considerable distances, millimeters to 10s of millimeters are piezoelectric as well as electro-magnetic and magnetic devices. One of those devices is marketed by New Scale Technologies of Victor, NY as what is called the SQUIGGLE Motor with dimensions of 1.8 by 1.8 by 6 mm. These SQUIGGLE motors are described on https://www.newscaletech.com/resources/technology/squiggle-micro-motor-technology/which is incorporated herein by reference. Other constructions are possible and are contemplated and will not substantially add to consume depth.

Accordingly, a camera system as illustrated in FIG. 23 and FIG. 24 illustrates a hybrid gimbal wherein yaw rotation is corrected or created using image technology while rotation in pitch or roll are countered or created by motorized micro-platforms.

A processing unit herein is a chip or a plurality of chips that are enabled to execute processing instructions such as known in the art of processing and computer machines. Processing of an instruction includes retrieving and enabling of a processing instruction such as adding a content of a memory to a content of a register, for instance. These are ultimately physical operations. A processing unit may be a processor such as a microprocessor, a core of a multi-core processor, a dedicated co-processor such as a Graphics Processing Unit (GPU), a customized processor such as a Field Programmable Gate Array, a computer, or any device that may be identified as a processor and that is enable to execute instructions. Instructions and/or data may be retrieved from separate or common memory and stored in local memory. The distinction between processor and processing unit is made, because processing cores in a multi-core processing may not always be recognized as a separate processor. A processing unit therefore herein is a device with physical structure, commonly including one or more electronic chips or chip area.

It is well known that certain people have, what is called, a better eye for image composition and photography. Some of these skills are unique and are difficult to share. However, certain compositions may depend on location and pose of camera, and for instance timing. For instance certain scenes and/or objects may appear better on a photo or video from a certain point of view and at a certain time of day. For instance certain pictures show very well with the sun at a low position shining from behind the camera in the direction of the object or scene. In accordance with an aspect of the present invention a location and pose of a camera are stored for retrieval on a computer device. This data may be shared with devices that recognize or are able to use location and pose data, and allow a user to place a camera in a similar or related pose using the herein disclosed capabilities of a camera system.

Figure 25:
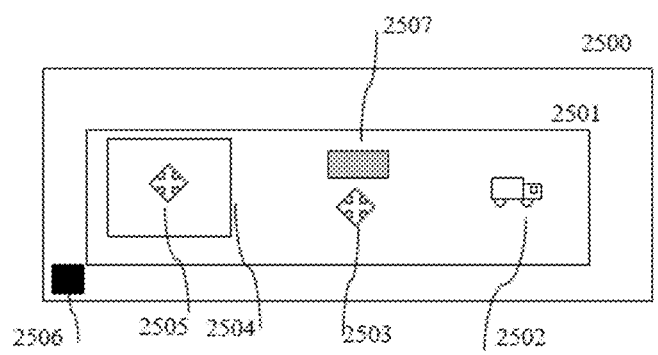
FIG. 25 illustrates an embodiment of a panoramic camera in accordance with one or more aspects of the present invention.

In one embodiment a camera system as disclosed herein is enabled to extract an image that is identified as not being in a center of a camera viewer. For instance a screen of a camera system may be applied as a viewer of an entire panoramic image. This is illustrated in FIG. 25. A screen 2500, which preferably is a touch screen, displays a panoramic image 2501, for instance generated by a camera system as illustrated in FIG. 23. The image 2501 may provide a center icon 2503 indicating a center pointing direction of the camera system. The screen may also display in a window 2507 that may be transparent details about a center direction, including data about a preferred location, such as distance from the camera and/or geographic coordinates of a scene. These displayed data may be called focus or tracking data and may be modified, or entered by a user of the system. Within the camera system's field of view is an object 2502 which may be a truck. By way of a touch screen instruction a uses may draw or enable and then drag a window 2504 centered at an image location 2505. Through a calibration of image space or pixel space of image 2501 and pointing direction relative to 2503, a processor determines actual pointing direction of the camera system relative to image center 2505. The window with center 2505 may be confirmed and activated by activating confirmation button 2506.

In one mode of operation of the camera system an image which is preferably a video image of an object or scene corresponding to a pointing direction to 2505 is created. In effect this means that a camera system pointing initially forward to pointing direction 2503 creates an image of a scene located in the direction of 2505. This is beneficial if for instance a camera is placed in a forward looking direction of movement and images in a more peripheral direction are needed. Accordingly, when a panoramic image covers an angle of view of 170 degrees and the camera system is pointed forward, that is a center camera or a holding direction determines an apparent viewing direction, an actual image of a scene in a pointing direction of 30 degrees (= or −30 degrees) from the apparent pointing direction may be recorded. In a further embodiment an image of a scene located with its center about up to plus or minus 45 degrees rotation from its center direction may be recorded. An angle of view of the panoramic camera of preferably 180 degrees may be created as described herein, up to an angle of view of 200 degrees or even greater. When one maintains an angle of view of 60 degrees of the extracted image, then at an overall angle of view of 200 degrees for a panoramic image a center of a scene at a pointing direction of plus or minus 70 degrees rotated away from a center of a camera system or a pointing direction of a user is extracted from the panoramic image.

This specific aspect of image extraction is called "sideways imaging." Sideways imaging is useful in for instance situations wherein a camera held by a user cannot be turned. For instance a body camera is attached to a body of a forward moving person who cannot turn his or her body during movement and thus an embodiment as disclosed herein still allows to take images including video images of a scene that is being passed by the person. Another use is the unobtrusive recording of a scene of a child or multiple children in their behavior not interrupted by a camera pointing at them. Many people in a scene who are aware of being recorded by a camera stop acting naturally and thus may spoil a recording of their natural behavior. With a sideways imaging camera it may look like another scene that the camera is pointed at is being recorded leaving the behavior of person or persons that are of interest mostly undisturbed and of a more natural nature.

Another use of a sideways imaging camera is when an activity is recorded by a camera attached to person focused on a first part of a scene, while it is of interest to that person to record a second part of the scene that the center of the camera is not pointed at. For instance a glassblower carrying a head attached camera may focus a center of a camera on a glass object that is being puntied or transferred from a blowpipe to a punty rod. To remain in control of the hot glass the head of the glassblower is directed to the hot glass piece on the blowpipe. However, of interest may be the activities of the helper who is attaching the punty to the piece on the blowpipe. There are actually a fair amount of videos about this type of activities on channels like Youtube, which are limited for feedback as they basically already show what the glassblower sees during piece transfer, but not what she probably would like to see. Sideways imaging cameras are helpful in that regard. In a similar vein this type of camera is helpful in training of better situational awareness in for instance the game of soccer. Certain common mistakes in losing a ball in a duel with an opponent may be clarified with extracted images of close by opponents that are in the periphery of vison of a soccer player.

In one embodiment of the present invention, an image of a scene with an object in window 2504 is recorded with camera 2500 and is associated with a position of device 2500 determined by sensors, such as inertial sensors and GPS sensors or other positional sensors. One may store viewing direction and/or location of the scene in window 2504 in memory by activating a menu element or a button. A picture of the scene in 2504 can be reviewed in any position on a screen for instance on 2500. The camera 2500 may be switched off or moved and later may be put back in about the same position and pointing direction towards the 2504 captured scene. If another user or a user returning after leaving a scene is unsure where to point the camera, the camera system being instructed to capture a location corresponding to the scene previously captured by window 2504 may give on-screen instructions, with on screen arrows for instance, how to place the camera in a pose that either captures 2504 in its center or to place the camera 2500 in a pose that places the entire camera in its original pose. Furthermore, additional on-screen instructions may be given to place the camera 2500 in or about its original location. This may be useful when a changing scene (over different seasons, or during construction) is being camera recorded and comparative images and/or videos images are desired. Clearly, it is difficult to find the exact spot in for instance a field after 2 months if there are no markers or markers have been removed.

Positional and inertial sensors, 3-dimensional geometry, projective geometry and for instance RANSAC software as is known in the art are used to enable the positioning and computations. Determining of a pointing direction is disclosed in for instance U.S. Pat. No. 7,741,961 to Rafii et al. issued on Jun. 22, 2010 and U.S. Ser. No. 13/058,962 to Garcia et al. filed on May 6, 2011 which are incorporated herein by reference.

A portable and mobile computing device such as smartphone has capabilities to determine its geographic position in coordinates such as GPS coordinates. It also can determine a position of a point in coordinates that is on a distance 's' from the camera. For instance a camera is in position A, pointed at a point B, wherein a distance from A to B is determined, for instance from a focus mechanism by focusing, or by manually entering a distance. Known geographic geometry can be applied by a properly configured processor to determine the geographic coordinates of point B. Another way is to move the portable and mobile computing device to position B and record the GPS coordinates and store it on memory as PointB. A user can then move to any other point and instruct the processor to record a pointing direction at PointB. The processor first determines its current position, let say PointX. It determines a required orientation of the platform relative to PointB and instructs the camera to be pointed at PointB. If a current pose of the camera (including relative to a horizon and a compass direction) is outside a range of panoramic image, visual instructions may be provided for instance to a user, to place the portable and mobile device in a pose that has PointB in its field of view.

In one embodiment of the present invention, the camera system is part of a surveillance camera that is fixedly or removably attached to an object or a structure, including a building, a vehicle, a drone, a post, a fence, a person, an animal or any other fixed or moving object that can hold the camera device. In generally existing surveillance cameras are attached to external motors to pan an area. The surveillance camera can be fixed to a structure.

A computing device herein is a device with a housing with a processor enabled and configured to retrieve instructions from a memory, to execute instructions to perform steps that can be represented as programming steps as in Matlab, C#, Java, Python and the like. The instructions may process data retrieved from memory or provided via input devices such as keypad, touchpad, mouse, camera, sensors, a microphone, a communication channel and the like which are part of the device. The computing device connects to a communication channel, which may be a network connection, via communication circuitry, which may be wired or wireless oriented equipment. A display screen may be included for input and output purposes and a loudspeaker or at least an audio output and image and audio circuitry. Output may be provided on an output channel. Certain sensors such as accelerometers, a gyroscope and a digital compass as well as GPS circuitry may be included. An antenna may be included as well as a power supply. An example of a computing device is a smartphone, a tablet, a laptop and a desktop computer.

To establish a panoramic image from image data only generated by image sensor elements in active areas of image sensors herein means that the image data only generated by and only harvested from active areas are stored in a retrievable way as a single substantially panoramic image or proto-image. A substantially panoramic image or proto image is wherein no or almost no overlap data is included. A proto-image is image data that may require additional processing like demosaicing or color correction or warping. Initially one may apply available stitching software to determine a stitching line between two calibration images. An image sensor map may map pixels in an image to the physical pixel elements on an image sensor. This allows to determine a physical merge line that determines an active area of an image sensor and creates a panoramic proto-image or panoramic image representation in memory when for instance harvested image data from active areas are stored in a contiguous and retrievable way on a memory which may be called image memory.

As explained before, while the harvested data from active areas already represent or substantially represent a panoramic image, additional processing may be needed to optimize the image data for viewing. This may include color correction and/or gray scale correction. Doing color correction in real-time is known and is for instance disclosed in Sigurd Ljodal Master's Thesis 2014, Implementation of a real-time distributed video processing pipeline, downloaded from https://core.ac.uk/download/pdf/30903173.pdf which is incorporated herein by reference. Similarly Espen Oldeide Helgedagsrud in Master's Thesis Efficient implementation and processing of a real-time panorama video pipeline with emphasis on dynamic stitching downloaded from https://www.duo.uio.no/bitstream/handle/10852/37683/Helgedagsrud-master.pdf?sequence=2&isAllowed=y discloses which is incorporated herein by reference, teaches real-tine color correction. Fast operations are achieved by parallel operations by for instance dedicated GPU processors. In accordance with an aspect of the present invention, color correction requirements may be determined in a calibration step prior to real-time operation. That is: required transformation matrices are computed based on stored calibration and/or actual conditions. Optimal correction may be estimated and computed prior to real-time recording. Because no additional determination and expensive estimations may be required and correction is a simple execution of previously stored parameters. The above solutions are part of the Bagadus System: Bagadus: An Integrated Real-Time System for Soccer Analytics, HAKON KVALE STENSLAND et al. 2014, downloaded from DOI: http://dx.doi.org/10.1145/2541011 which is incorporated herein by reference.

In accordance with an aspect of the present invention each camera may experience distortion, such as barrel lens distortion. There are commercial products available that correct in real-time image distortion. One possible approach is to determine a required distortion correction (which usually is a geometric distortion, such as straight lines) which may be corrected by pre-determined image warping. This is explained for instance in Mattoccia et al, Real-Time Image Distortion Correction: Analysis and Evaluation of FPGA-Compatible Algorithms, 2916 downloaded from https://arxiv.org/pdf/1610.09712.pdf which is incorporated herein by reference. Another example of real-time image distortion correction is: Van der Jeught S, Buytaert J N, Dirckx J J; Real-time geometric lens distortion correction using a graphics processing unit. Opt. Eng. 0001; 51(2):027002-1-027002-5. doi:10.1117/1.OE.51.2.027002, which is incorporated herein by reference.

All corrections may be predetermined and related matrices and/or parameters may be stored in memory for appropriate retrieval, for instance after a calibration check by a processor and implemented in parallel for instance on GPUs or FPGAs for at least each camera. The immediate execution of the software and circumventing a necessity to first apply a processing time expensive of determining or estimating required parameters creates a very fast processing system that may be include several parallel video pipelines. The result is a high quality video image generated in real-time which may be used in accordance with one or more aspects of the present invention as a digital gimbal to generate a (smaller) stable image of a scene from a panoramic image. The cost of relative cheap processing power that continues to diminish in cost while increasing in power, allows the use of 2 or more relatively inexpensive but high quality cameras, instead of using expensive lens wide view cameras and expensive and more failure prone mechanical solutions.

High quality photography is often a matter of selecting an object and selecting an appropriate point of view and the therewith related pose or attitude of a camera. For instance a large object may be best photographically recorded from a certain distance or from a certain view. In accordance with an aspect of the present invention the coordinates of a location related to a point of view are retrievably stored on a memory, for instance on a memory controlled by an online server, or on a memory in a camera system. The camera system is enabled to access the coordinates and has a processor that is enabled to guide a user to or in the direction of the coordinates of the point of view location. The memory has at least one of two ways to direct the camera system towards the object of interest. In one embodiment coordinates, preferably including an altitude, of the object are provided to the camera system, for instance via an online connection or from a memory on the camera.

The cameras system, using common geometric and surveying computations determines the required pose of the camera to record the image and uses inertial sensors to create feedback to a user to place the camera in the correct pose. A processor may do this with visible indicators on a screen or tactile signals via tactile actuators on the camera system or audio signals generated by the processor on the cameras system and/or any combination of these signals. An alert may be generated when the camera is in the correct pose. One may also store the correct pose retrievably on a memory. In that case a processor may not be required to compute a correct pose, but uses its inertial and other sensors to place the camera in a correct pose to record the object. Additionally, a previously recorded image of the object taken from a location with recorded coordinates and/or pose data and/or data and time data may be retrieved and displayed on the screen of the cameras system. Preferably the pre-recorded image of the object has one or more identifiers which allows the processor to scale the pre-recorded image to match or substantially match the actual image recorded with the camera system. Preferably, the pre-recorded image may be faded or made transparent by the processor so it serves as an alignment template. Extracting or determining alignment marks are known in a range of image segmentation instructions or corner detection as is known in the art.

As discussed above a composite panoramic image, also called an extended image space, may be formed from images generated by multiple cameras in a single housing. From the extended image space a smaller stable window, called a gimbal window or e-gimbal window or e-gimbal, is created and may be displayed on a display/screen representing a stabilized image, with may be a video image. The inventor has checked the USPTO Trademark database. The name e-gimbal is not a registered trademark. The term 'egimbal' was trademarked but has been abandoned. Thus the name e-gimbal, which is short for digital gimbal, is currently at the time of submission not a trademark and is believed not to conflict with any private ownership and is believed not to require permission of use. However, the term e-gimbal herein is intended to mean "digital gimbal" as opposed to the known "mechanical gimbal" which applies motors or mechanical actuators.

It is assumed that the image space of the extended image is linear and homogeneous. This is not a pre-requisite as one may homogenize a window area later, specifically preventing the need to homogenize the entire image space. One may determine the gimbal window and homogenize by pre-warping, concatenation (if/when required) over multiple image sensor areas, do blending and other real-time corrections as needed. The result is that a specific area within a desired gimbal window is distortion free and of high quality. To ensure that one may use a global shutter system for the 2 or more cameras rather than a rolling camera system. The 2 or more cameras are preferably fixedly arranged in a single housing. So their relative positions are known and so are overlap regions and a pre-set stitchline is known, for instance for scanning and/or storing only data harvested from specific and specified sensor areas as was disclosed by the inventor earlier. One may use curved image sensors and preferably identical lenses or lens systems so distortion correction is uniform for all cameras and in essence one creates a panoramic (if desired multi-image like 3 by 2 or 3 by 3 combined images) wide-view image with a negligible amount of distortion.

To create a stable image from a moving camera often mechanical gimbals are used which keep a camera directed to a pre-set pose or in a pre-set direction. In addition one may include a controller that allows a processor to detect or segment an object in an image and have a controller direct one or more motors or mechanisms in the gimbal to track the object. As a result one may create a stable video image of an object with a moving camera and/or an object that is moving. One example of object tracking is the Insta360 Flow Pro for smartphone marketed by ARASHI VISION INC. as per https://www.insta360.com/.

A mechanical gimbal is an extra device that a camera user has to buy, to carry and that needs power. A camera gimbal is a mechanical stabilizer that uses motion detectors and motors to keep a camera level and/or stable while the camera and/or the object moves. Gimbals may use internal inertial sensors such as accelerometers and gyroscopes for one or more processors and/or processing cores to control one or more motors of a platform to which a camera is attached, which then calculate how much to move in the opposite direction to counteract any shake. And/or to control motors to keep an object within a field of view of a camera. Gimbals may come in different types: for instance 2-axis and 3-axis modes. 2-axis gimbals only cover tilt and roll, while 3-axis gimbals cover all three rotational axes (pan or yaw, tilt or pitch, and roll).

The herein provided e-gimbal or digital gimbal is applied to track an object which may be moving with a camera that may also be moving. A current (video) camera has a fairly narrow field of vision (FOV). The FOV in landscape is about 80 degrees and in portrait orientation about 50 degrees (with a greater ceiling reach). As a consequence a moving object captured with a moving camera for instance by a walking or running user, may leave the field of vision of the camera. And often, because of the abrupt movements of the user may generate an unstable somewhat jerky image.

A mechanical gimbal as a platform for a camera stabilizes the movement of the camera. The camera keeps focused or trained on the object and motor control counters the movement of the camera. Thus the mechanical gimbal provides 1) image stability and 2) keeps the object inside the field of vision of the camera which may be moving. The mechanical gimbal has processor controlled motors that counter the rotation or movement of the camera. The relative movement to the object may be characterized as pan rotation (around z-axis) (θpan), tilt rotation (around y-axis) (θtilt) and roll rotation (around x-axis) (θroll). Sensors, like inertial sensors, such gyroscopes and accelerometers, determine the rotation angles and the speed of rotation, while other sensors like GPS systems may determine the geographic position of the camera (including altitude) and a magnetic compass determines the orientation of the camera.

In its simplest form a mechanical gimbal counters the measured rotations relative to a pointing direction, so the camera remains trained on the same point. Mechanical motors of course have mass and latency as well as the parts of the gimbal and the camera. This means that there are delay effects to be taken into account and the camera position may overshoot or undershoot its intended position. These issues are well known and documented. In general controllers, like PID controllers and/or filters such as Kalman filters and/or predictive filters may be used to smooth and optimize the signals that control the motors of the mechanical gimbal. Still certain effects may occur that give the mechanical gimbal a jerky effect or unable to follow certain vibrations.

Mechanical gimbals are well studied and an abundance of literature exists on classical (PID) gimbal controllers. One overview is provided by the thesis: Thinh Huynh, A Study on Motion Control of Gimbal-based Target Tracking System, February 2022, Pukyong National University, downloaded from https://repository.pknu.ac.kr:8443/bitstream/2021.oak/24416/2/A%20Study%20on%20Motion%20Control%20of%20Gimbal-based%20Target%20Tracking%20System.pdf which is incorporated herein by reference.

A further explanation of good object tracking applications is provided on website https://www.oxagile.com/article/tracking-live-video-objects-with-a-moving-camera/ by Oxagile Corporation of New York, NY, which is incorporated herein by reference. Herein KCF—Kernelized Correlation Filter came out as a very usable tracking application. One may use the KCF application to determine a position of an object and apply the determined position as a neutral of focus position of the mechanical gimbal. Other tracking applications are known and its application is fully contemplated.

In accordance with an aspect of the present invention, a trajectory or position prediction algorithm such as a Kalman filter, may be applied to estimate a future position of an object allowing to search an exact position of an object in a smaller region of the extended image space and thus allowing computationally faster object tracking. One may also, delay processor response by one or more frames, and apply frame look-ahead to "see in the future" and accept a slight delay in response of the tracking system.

In accordance with an aspect of the present invention, a camera generates an extended image space Se which covers an area, for instance shaped as a rectangle, that is about 8-10 times larger than a standard image size. For instance a "standard" camera generates a rectangular image of are Ss=a*b wherein a and b are the sides of the rectangle. The extended image space is Se=a'*b' with for instance a'=3*a and b'=3*b, as an illustrative example. The extended image space may be generated with a fisheye lens, but preferably is generated by 2 or more cameras preferably fixed in a housing and defined "active image sensor areas" wherein a combined image formed from data harvested from the active image sensors is a stitched panoramic image or is substantially "stitched". Substantially "stitched" means that mis-alignment of images is within a range of pixels, preferably less than 15 pixels, more preferably less than 10 pixels and more preferably less than 5 pixels. Complete alignment may be achieved by a simple translation of images as potential distortions around a stitchline have been resolved by pre-warping. Mis-alignment may be created by environmental conditions. All cameras and sensors are preferably identical, so variation in parameters over change in environmental parameters are identical and a simple image shift resolves mis-alignment.

The extended size of the image space Se translates into a much wider field of view of a multi-camera system. For instance, a multi-camera system may have a field-of-view of 180 degrees or even larger such as 200 degrees or larger, which implies that a camera may stick out from a housing surface. This has as benefit that a moving object and/or a moving camera recording an object and/or a moving camera recording a moving object, with the camera being a wide-field and/or multi-camera as disclosed will continue capturing the object in its field-of-view, even with the camera and or object having significant movement.

While this is desirable, it will make viewing the object somewhat uncomfortable as one has to view a large image and the object may travel in seemingly an uncontrolled and somewhat jerky way across the wide image space.

In accordance with an aspect of the present invention, only a part of the entire possible image space is displayed on a display or screen. By providing a display window which may be called a gimbal-window or e-gimbal of a size smaller than the complete image space, it seems a static image display of an object. In fact it may be a display of different parts of the entire image space in a video image. It will give the impression of a static scene and thus the display method works like an gimbal. But not a mechanical gimbal, but rather a digital or e-gimbal.

Figure 26:
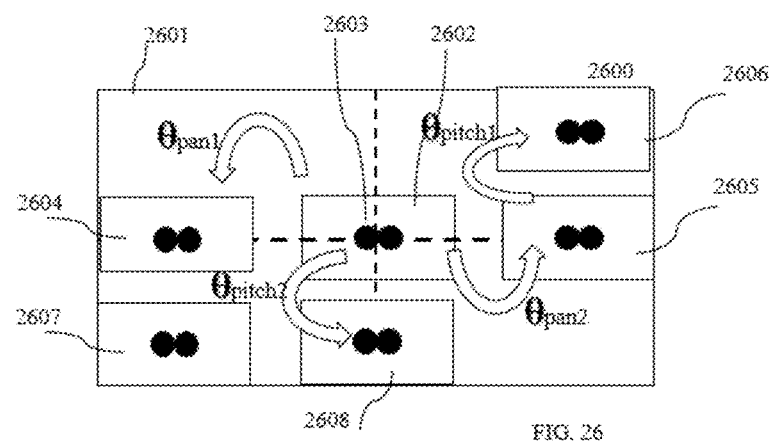
FIG. 26 illustrates a working of a digital gimbal in accordance with one or more aspects of the present invention.

The e-gimbal is schematically illustrated in FIG. 26. The arrows in FIG. 26 are identified as θpan1, θpan2, θpitch1 and θpitch2. A camera, which may be a multi-camera system in a single body with fixed positions of the individual cameras. Each camera has a "standard" image space, for instance a 4:3 image aspect ratio, or something like 1280 by 720 pixels or higher resolution. In general a 4:3 aspect ratio or close to it is common. FIG. 26 illustrates in a composite drawing 2600 an image space 2601 formed by pre-set active areas of 2 or more image sensors, for instance. With 3 rows of 3 cameras one still has (of course) a 4:3 aspect ratio, but now with an image space 2600 that is over 9 times as large as the smaller standard image space 2602 of a single camera and/or camera display. Assume a moving object 2603 captured in centered window 2602. Thus a standard display displaying image space 2602, shows the object 2603. Assume the object 2603 is static but the camera is rotated to the right under a panning angle θpan1. Which appears as if the object has moved to the left. The object thus has left window 2602 and if displayed on a display, it would not show the object. In fact the object 2603 is now in image space defined by window 2604, wherein the window 2604 preferably has the same size as 2602. A similar effect occurs when the camera system pans to toe left and the object appears to the right under angle θpan2 and is now in image space in window 2605. Similarly, when the camera is rotated up, it seems as if the object moves to window 2608. And if the camera system is rotated down and left, under angles θpan2 and θpitch1 it appears if the object has moved to window 2606. Also a window 2607 is shown which is result of rotation θpan1, θpitch2.

In order to create a window in the correct position of the extended image space one needs to associate a rotation of the camera in physical space with a correct and corresponding movement or rotation in extended image space relative to a center point. In one embodiment a translation table may be created wherein one steps through all possible (one-pixel) rotations and associate each step in image space with a physical camera rotation and store the conversion in a look-up table. One may also determine projective relations between rotation and image space. The matching of physical rotation relative to a neutral center over many positions appears to be a task that may be performed by deep learning with a neural network application. Because preferably identical individual cameras are used the calibration between the physical space rotation and position in extended image space has only to be once at a controlled laboratory scale, using large sets of training data. However, the control application may be used in many identical implementations.

In the above a novel e-gimbal video camera system has been disclosed. One aspect of the e-gimbal system is the ability to form an extended image space. for instance by using multiple cameras. By capturing part of a relevant scene or object within the extended image space even when the camera is moving and/or the object is moving, the display of only the relevant window will provide a stable video image. This requires a calibrated extended image space wherein a neutral focus direction is determined and a position of an object in the extended image space when the object is no longer in the center or neutral point of the image space. As example the center of an extended image space has been used to illustrate this concepts. However one may use or define any point in the extended image space as neutral point, like an extreme corner. By determining a rotation angle (in pan and/or pitch and/or roll direction) one may then determine a display window around the object or scene that is determined based on the measured rotation. All rotations may be measured and recorded from camera sensors, like inertial sensors including gyroscopes, accelerometers, compass sensor as well as GPS. The pointing and positioning data may be recorded and synchronized with the recorded image data. This allows computation and determination of a display window, which is called an e-gimbal window herein. Object tracking application (like KCF tracking) may be applied to track an object in extended image space of the camera and compute a stable display e-gimbal window for a stabilized video image display.

The application of the disclosed e-gimbal technology is beneficial in that it does not require the use of mechanical gimbals. In accordance with an aspect of the present invention, one may use mechanical additions that are easy to carry. For instance a simple tripod with a structure to hold a cellphone or smartphone in a stable fixed position may be used. This will prevent unwanted roll disturbance and allows tracking of objects in front of this camera over a wide field-of-view, which is preferably 180 degrees and more preferably at least 200 degrees. The tracking of an object may be facilitated by attaching a GPS device or electronic position device on an object. The position of the object may be recorded and synchronized with the video image as well as all positional, directional sensor data of the camera system. This allows for a simple computation of a position of the object with positional device in the extended image space.

A variation thereof, that does not require a positional device on or at the object is to use an additional camera that also captures the object. The second camera needs not have an extended image space, but preferably has. However the first camera with extended image space and a second camera both should have the capability to determine a position of an object and a vector that point from the camera to the object. Simple geometrical computation allows a precise determination of the position of the object and based on already disclosed extended image space capabilities a determination of the object, which may be moving, in the extended image space and thus create an e-gimbal window for that object. The cameras may be in a fixed position, but one or both may also be moving.

In accordance with an aspect of the present invention a neutral image window is set by activating central window 2602, which is determined for instance by a compass sensor in or attached to the camera and one or more inertial sensors in the camera or other positional sensors which may include GPS, as is known in the art. A camera sensor system determines the rotations of panning and/or pitch and determine display windows associated with the measured rotation. In this way, the display keeps displaying an image corresponding with the object in the neutral position.

In a mechanical gimbal motors would be activated to counter the rotation of the camera. In the present situation there are presumably no gimbal motors. Preferably the extended image space 2601 is linear and homogeneous. That is, no or almost no distortion in the extended image space occurs. In that case the center of the new window may be computed based on the measured rotation angle. A faster way that takes into account non-linearity may be to sample the entire extended image space, for instance based on individual pixels and associate each pixel, or otherwise determined window center, with rotation angles for panning and pitch and if desired for roll. With a fixed window size, the gimbal window determination is almost instantaneous. And the display then displays the image inside the new window. One has thus created an e-gimbal for a moving camera, in accordance with one or more aspects of the current invention.

In order to prevent overcrowding FIG. 26, aspects of camera roll has not been show. One may in one embodiment limit the e-gimbal to 2 degrees of freedom, assuming that a user can keep a camera fairly level. However, preferably the roll (rotation relative to the horizon. A real-time compensation of a swing of plus or minus 15-20 degrees in video is being applied and especially with a dedicated processor and/or processor core. Such computations are realized in real-time, for instance in OpenCV, disclosed earlier herein.

In accordance with one or more aspects of the present invention an all-electronic gimbal or e-gimbal is provided on a single camera system, possibly and preferably with multiple cameras that creates an extended homogeneous image space, that creates a stable image of a scene in a predetermined position in a display window recorded with a moving camera, the moving camera having positional sensors accessible by a processor preferably on the camera. With sufficient processing power the e-gimbal may be applied in real time generating a stable image on a display of the moving camera system. One may also record and synchronize sensor and extended image data and create the stabilized e-gimbal image, which may be video image off-line in a post-processing manner that may be generated off-line. One may use for that a separate powerful computer or dedicated server, using image data and recorded positional and inertial data as input.

In accordance with an aspect of the present invention a size of an e-gimbal window may be pre-set, for instance at the size to fill a screen on a camera. In accordance with a further aspect of the present invention, a user may select pre-set e-gimbal window sizes, for instance from a menu of a screen of the camera system. In accordance with a further aspect of the present invention, a user may set the dimensions of an e-gimbal window as a customized e-gimbal window.

It is known that small high frequency movements are generally more computationally intensive and Optical Image Stabilization (OIS) is often used as a relatively inexpensive but effective way to suppress higher frequency small vibrations or shakes. In accordance with an aspect of the present invention OIS is applied to a platform internal to a housing of a multi-camera system or a wide vision system. Another way of this type of stabilization is Electronic Image Stabilization (EIS). One may apply that type of stabilization also by applying processing power. In fact one may introduce a couple of frames of latency/delay in display and apply a low-pass image filter to filter out the jitter type of image movement.

A more recent development is the use of neural networks in image stabilization, particularly convolutional neural networks. One such approach is described in Liu et al, Deep-Learning Image Stabilization for Adaptive Optics Ophthalmoscopy, Information 2022, 13, 531. https://doi.org/10.3390/info13110531, which is incorporated herein by reference. Another good article is Lee et al, 3D Video Stabilization with Depth Estimation by CNN-based Optimization, 2021, downloaded from https://openaccess.thecvf-.com/content/CVPR2021/papers/Lee_3D_Video_Stabilization_With_Depth_Estimation_by_CNN-Based_Optimization_CVPR_2021_paper.pdf which is incorporated herein by reference. One approach is to use a Convolutional Neural Network (CNN) architecture for supervised learning. One may use a number of different training inputs of frames of jittery video images as well as the optical flow of stabilized frames of the previous video stream and train the CNN by a loss function that optimizes the error between the input and output.

Neural networks may be applied for other image processing functions, such as fine-tuning image alignment, color-correction, image blending, image warping for instance for distortion correction and the like. This is beneficial in situations where the multi-camera system includes 2 or more cameras that are well known and potentially identical. This means that camera parameters and active areas and other parameters are identical or almost identical and controlled within narrowly defined tolerances. This means that all neural network training may be done on almost unlimited number of inputs and training cycles and may be implemented in 100s, 1000s or even millions of identical implementations for control purposes. Thus individual cameras do not have to be individually trained.

In fact practical AI Image Stabilization applications are available from different companies such as VIDIO from MOSAIK Studio, Inc. of Orlando FL and described on www.vidio.ai which is incorporated herein by reference.

Thus one is now enabled to create a very stable video image on a predefined size window or display of a moving camera, preferably using a moving camera with an extended image space as taught herein. This is especially useful for portable consumer cameras, such as used in smartphones and/or tablet computers or other camera devices for instance on a flying or flyable drone. This creates a stable focus on a static object or point in a scene as an e-gimbal.

A somewhat paradoxical effect of a gimbal, including an e-gimbal, is that it may work against changing a focus direction as the gimbal and/or e-gimbal keeps the selected direction as focal point.

In accordance with an aspect of the present invention, a processor is programmed to track a moving object. For instance a Kernelized Correlation Filter (KCF) approach is known in the field of computer vision to provide reliable object tracking as described for instance in Hagui et al. A Comparison of OpenCV Algorithms for Human Tracking with a Moving Perspective Camera, EUVIP2021—9th European Workshop on Visual Information Processing, June 2021, Paris (virtuel), France. ff10.1109/EUVIP50544.2021.9483957ff.ffhal-03248524f which is incorporated herein by reference. But rather than strictly image/object tracking the KCF or other object tracking image software is used differently. Either through systematic mapping, geometric mapping or supervised neural network learning, the extended image space of the cameras system is mapped into angles of rotations relative to a pre-defined center of the extended image space. For instance take the center of window 2602 in FIG. 26 as neutral center of the extended image space. And an object inside window 2602 then would have rotations $\theta pan=0$ and $\theta pitch=0$, assuming that the image space has been corrected for roll. This means also that the object being detected/tracked in window 2607 would be associated with $\theta pan=most\_left$ and $\theta pitch=most\_down$, which are angles determined empirically during training, calibration or other mapping. This means that when a moving object recorded with a moving camera is within the extended image space, its actual position relative to a center may be determined.

Furthermore, a center of the camera can be determined from the positional sensors of the camera system. However, for stable display one only needs to determine the relative position of the tracked object which determines its relative position in extended image space and allows a processor to capture and display the object within a pre-set window around the center of the object in extended image space. This allows a camera system as disclosed herein with an extended image space, for instance by using multiple cameras, to track and display a tracked object in a stable fashion on a display showing only a window smaller than the entire image space with a stable image of the object, while both camera and object may be moving. Which is another beneficial property of the disclosed e-gimbal system.

An issue that is resolved in accordance with an aspect of the present invention, is the willful change of focal direction of an active e-gimbal system, wherein the e-gimbal does NOT compensate the intended change. This requires the e-gimbal system to distinguish between unwanted movement and a desired change. Luckily, unwanted and wanted movement generally have distinguishable properties, but not always. So manual intervention by a videographer may be required. In accordance with an aspect of the present invention a computer system provides a menu of options that can be selected. This may include but is not limited to: 1) set center point; 2) keep center as focal point; 3) track an object; 4) allow focal direction movement. Other menu options may be provided, including create size of display window, determine compensation (roll, pitch, pan, individually or any combination thereof).

One may train a camera system on several of the common movements of a videographer: walking, running, crawling, jumping, biking, swimming, driving a car, etc. Using walking, one will determine that the walking moving may be fairly constant in forward direction but bumpy in vertical direction. While seemingly cyclic, the vertical movement of a walking person is not symmetric. That is humans walking generally move upward from a basepoint and return to that basepoint with little undershoot. For that reason, one cannot determine a vertical neutral pointing direction as an average of a walking movement. In accordance one may use an adaptive filter, like a Kalman filter to predict the return to a neutral point and keep the e-gimbal using that neutral point. OpenCV has a Kalman filter option for image stabilization. One may use a Kalman or other adaptive filter to determine a pointing direction. The filter is used to compute expected deviation of the base pointing direction. That is a pointing direction is set and maintained and the system is exposed to cyclic or random changes and maintains its preset pointing direction. The system is trained or programmed using vertical and horizontal movements, within certain parameters such as frequency range, amplitude of movements as well the range of these movements. Within these "unwanted" movements the e-gimbal keeps a constant pointing direction. However a smooth panning of the camera system left or right will show up as a violation of the tolerances of unwanted movement and a decision program in the e-gimbal system will decide that this movement is wanted and deliberate and sets the new pointing direction. For instance a walking person may have a vertical movement with perhaps a frequency of 2 Hz which may also affect the horizontal (panning) direction. A deliberate exceeding of the filter limits indicates a wanted change of pointing direction and is accepted by the system as new pointing direction. This applies in general to relatively smooth and one direction amplitudes and is easy to recognize by the system and instigates an update of the neutral position. A system may also detect that the e-gimbal window is getting close to the limits of the extended image space and updates the center accordingly and provides a tactile, visible or audio signal for a user of the system to adjust the pointing position.

Using Kalman filters for image stabilization is known. However, in the present case the Kalman filter or other adaptive filters are used differently to detect a deterministic movement of a focus direction of a camera wherein the detected movement is outside or at least different from quantified shake and or vibration.

In general, the vertical vibration or shake, for instance due to running or walking of a videographer or movement of a platform like a vehicle, is a main cause of video destabilization. Roll and pan are in practice fairly well controlled in manual camera handling. And certainly panning is an often used technique in video registration. In accordance with an aspect of the present invention, a user may instruct a processor on the camera system to apply each of the stabilization techniques individually, wherein only 1 or 2 or more stabilization orientations may be activated.

The application of the disclosed e-gimbal technology is beneficial in that it does not require the use of mechanical gimbals. In accordance with an aspect of the present invention, one may use mechanical additions that are easy to carry. For instance a simple tripod with a structure to hold a cellphone or smartphone in a stable fixed position may be used. This will prevent unwanted roll disturbance and allows tracking of objects in front of this camera over a wide field-of-view, which is preferably 180 degrees and more preferably at least 200 degrees. The tracking of an object may be facilitated by attaching a GPS device or electronic position device on an object. The position of the object may be recorded and synchronized with the video image as well as all positional, directional sensor data of the camera system. This allows for a simple computation of a position of the object with positional device in the extended image space.

A variation thereof, that does not require a positional device on or at the object is to use an additional camera that also captures the object. The second camera needs not have an extended image space, but preferably has. However the first camera with extended image space and a second camera both should have the capability to determine a position of an object and/or a vector that point from the camera to the object and does enable to determine an actual position by simple geometrical computation. It allows a precise determination of the position of the object and based on already disclosed extended image space capabilities a determination of the object, which may be moving, in the extended image space and thus create an e-gimbal window for that object. The cameras may be in a fixed position, but one or both may also be moving.

As shown above, one may have a fairly simple or a complex e-gimbal system, which depends on desired functionality. Extended image space generates a significant amount of extra image data. One may in a simple application only keep the e-gimbal data. Furthermore, significant processing steps may be required putting a significant demand on processing capability. As explained above, one may implement an e-gimbal in real-time or one may record all extended image space data as well as the required pointing and positional and rotational data and create the e-gimbal video image off-line on a more powerful computer. Assuming a relatively small on-camera display, one may generate a sampled-down on-camera e-gimbal image. This will provide at least a lower quality e-gimbal image to provide an indication of the potential result.

Currently, at the time of writing this, smartphone and camera processors have greatly improved capabilities and forming the extended image space as well as the follow-up processing can be done for certainly average to higher resolution quality images, but may require additional processors for 5K or higher quality images. Especially availability of multiple processor cores and/or co=processors like GPUs, enable the parallel structure of image processing.

Moore's law (after seemingly to have paused for a while) appears to be in full effect. And rather than looking solely at transistor count, but looking at instructions per time per surface, an enormous increase in local processor power is taking place. Both NPX and Texas Instruments for instance have launched extremely powerful digital signal processors while dedicated Neural Processing Units (NPUs) are being developed. Thus, an e-gimbal, while computationally fully enabled, may for mass consumer purposes be implemented with only base capabilities. However, it seems that a fully functional e-gimbal with highest resolution images may be implemented on an affordable scale to work real-time on a consumer smartphone within 4 or 5 years after writing this.

Additionally, neural network systems have greatly improved. And deterministic steps as explained herein may all be replaced by training a neural network system using supervised or unsupervised learning, using almost unlimited training data. Especially Convolutional Neural Networks (CNN) are popular in vision systems.

In accordance with one or more aspects of the present invention, deterministic image processing and/or computer vision steps are replaced by Deep Learning or Neural Network based implementation. Aspects like camera calibration and camera tracking (identifying a pointing direction of a camera in an (x,y) projection image) are known. The enablement of these methods in traditional applications will briefly be summarized herein to provide background.

Camera calibration may be performed with a camera capturing a known image, usually a chessboard-like image. Current application such as Matlab and OpenCV then may be applied to undistort what are generally called the intrinsic distortions of the camera. This is for instance taught in https://docs.opencv.org/4.x/dc/dbb/tutorial_py_calibration.html which is incorporated herein by reference. One may apply the undistort to each of the individual cameras. Keeping in mind that all individual cameras are practically identical in a multi-camera system herein. This allows for a highly parallelized computation approach with separate processors or processor cores performing the correction. OpenCV can execute undistortion well in real-time. The undistortion of the calibrated active areas of image sensors and combined in memory, establishes a large homogeneous extended image space, larger than an image space of an individual camera.

In a next step one needs to match a pointing direction of the camera system of multiple camera with a coordinate (x,y) point in extended image space. This is also known in image processing and is known as image projection for instance as explained in on-line document https://www.cs.cmu.edu/~16385/s17/Slides/11.1_Camera_matrix.pdf as lecture from CMU School of Computer Science and Lecture 12: Camera Projection published by Penn State University at https://www.cse.psu.edu/~rtc12/CSE486/lecture12.pdf which are both incorporated herein by reference, and should be well established knowledge for someone with ordinary skill in the art of computer vision. One may then find the rotation matrices that project a known point in physical space to an (x,y) point in image space. In Matlab one may use the 'estworldpose' to determine or estimate the camera pose. A more elaborate approach, but much faster in execution, is to associate a neutral position (like the center CTR of a camera) with the center position of the image. One then steps the camera through panning, and pitch and if desired roll, rotations and associate the rotation with measured (x,y) positions, By taking sufficiently large steps one may use linear interpolation to determine intermediate position. Such a conversion from rotation to coordinates circumvents potentially expensive rotation matrix calculations. In a multi-camera system one may determine the conversion for just one camera and use the conversion for all cameras appropriately as presumably all cameras are identical.

Image processing and computer vision are currently still mainly procedurally deterministic processes and rather computational intensive, with a need to carefully tune boundary effects. The use of deep learning or neural network of computer vision procedure is coming in its own right now and is a realistic and attractive alternative to programmed computer vision. A downside may be the need to train the neural network, to find the correct layer sizes, to find a correct loss function, to correctly label training data in supervised learning and the time it requires to train a neural network. However, a great benefit, when done correctly, is a training in a broad array of different conditions, the use of dedicated neural network processors or NPUs, and the speed of execution. The execution of a trained neural network is orders of magnitude faster than the training requirements and may be at least an order of magnitude faster than standard image processing programs. Some of the following image processing/computer vision neural network tools are available that can train neural network for steps as provided above in accordance with one or more aspects of the present invention. TensorFlow and KerasCV as disclosed in https://www.tensorflow.org/tutorials/images and pages it points to is incorporated herein by reference is a deep learning computer vision toolbox that implements steps of the e-gimbal as disclosed as one or more aspects of the present invention. Pytorch is another powerful neural network based toolbox.

An inventive concept herein is the creation of an extended image space from multiple preferably identical cameras wherein the extend image space is preferably homogeneous and a location is determined in the extended image space wherein a window of image data is created and the image data of the window is displayed on a screen or display. This creates in one embodiment of the present invention a highly effective real-time electronic, substantially software or processor instruction based gimbal system to create a stable image of a scene and/or an object wherein the camera and/or the object is moving.

Deterministic steps or methods using known or modified known image/vision steps have been provided. Neural network applications, including Convolutional Neural Networks (CNN), supervised learning and reinforcement leaning (RL) all already have been applied in camera calibration, image undistortion and camera pose estimation as well object tracking and adaptive filtering in computer vision. While fairly recent, these methods have been well documented and may be implemented by one of ordinary skill with practice skills in computer vison programming such as OpenCV as well in programming in KerasCV and Neural networks is able to implement the above steps in one or more neural networks without undue experimentation. For example camera calibration and undistortion by neural networks is disclosed in Bogdan et al., DeepCalib: A Deep Learning Approach for Automatic Intrinsic Calibration of Wide Field-of-View Cameras, CVMP'18, Dec. 13-14, 2018, London, United Kingdom, https://doi.org/10.1145/3278471.3278479, which is incorporated herein by reference. The article is accompanied by github available software implementation available from https://github.com/alexvbogdan/DeepCalib which is also incorporated herein by reference.

Estimating a camera pose with neural networks is disclosed in Shavit et al. Introduction to Camera Pose Estimation with Deep Learning, downloaded from https://arxiv.org/pdf/1907.05272 which is incorporated herein by reference. In practice a much simpler way is to apply supervised learning on a neural network by stepping through known camera rotations and labeling correct positions in the image space.

Deep learning is thus a sound and effective way to train neural networks on the different aspects of the e-gimbal. The process is facilitated that all cameras preferable are identical, have a fixed position relative to each other and have the same lenses, images sensors and the like. One then trains the individual cameras and if needed the integrated camera under different lighting and focus as well as movement conditions. Except for object tracking, the e-gimbal works independent of a scene or object but mainly depends on physical conditions, positions and rotations and in that sense is similar to a mechanical gimbal, but without the required mechanical equipment.

As an illustrative example to train a Convolutional Neural Network (CNN) to determine an (x,y) coordinate in an image space, using for instance a small point-like LED and rotating the camera (in this case only for panning direction) and mapping it to image space coordinates, the following steps are provided. Understood. To compute the coordinates of the LED image based on the camera's rotation, it is needed to establish a relationship between the camera's pan angle and the LED's position in the image. Assume one applies Tensorflow to invoke an CNN and using Python the following steps are required.

Necessary Libraries: import Tensorflow and layers and models; import numpy and import cv2 (OpenCv)

Capture and Preprocess Data: Capture Images: Use OpenCV to capture images from the camera while panning. Label Data: Label each image with the corresponding pan angle.

Define the CNN Model: Initialize a Sequential Model: Start by creating a sequential model. Create Convolutional Layers: Add convolutional layers with filters (e.g., 32 or 64 filters) and specify the activation function. Add Pooling Layers: Include one or more pooling layers (e.g., max pooling) to reduce the spatial dimensions. Create a Flatten Layer: Flatten the output from the convolutional layers into a 1D vector. Add Fully Connected Layers: add dense layers. Output Layer: Add an output layer for the regression task to predict the pan angle.

Compile and Train the Model: use a mean squared error loss function

Evaluate the Model: use known inputs to check correctness.

Use the Trained CNN Model for Real-Time Prediction:

In general neural networks are predictive in nature, in the sense that an end state of a neural network has a certain amount of uncertainty. In general an inference step is applied. The inference step involves interpreting the neural network's prediction to make a final decision. This step can include additional rules or logic that are not part of the neural network's architecture. However, the terms predicting and determining by a neural network is used herein to mean the same unless specifically distinguished. While strictly speaking an inference step may not be part of the theoretical neural network, for practical purposes an inference step is always involved. A simple inference may be if a computed uncertainty is less than 50% a neural network output is accepted as a positive action.

A purpose of the above is to allow one of ordinary skill in CNN programming, Python, Tensorflow and OpenCV applications to build the required CNN for mapping of physical camera angles to extended image space of a multi-camera system as disclosed herein above. One may add in a similar fashion also pitch angle transformation. And if required roll conversion. By object tracking in which one may also a CNN Model like KCF, the tracked position of an object may be converter to a coordinate position in image space. One may pre-define a size of a display window around a determined angle, to create a desired e-gimbal window. The use of neural networks may facilitate real-time execution. Multi-core CPUs, Graphic Processing Units (GPU), Neural Processing Units (NPUs) and Tensor Processing Units (TPUs) individually or in combination combined with a highly parallel architecture, may enable very fast real-time processing of the e-gimbal, and potentially an order of magnitude fast that deterministic implementations, which are also fully enabled herein.

It is assumed that neural networks and convolutional neural network as well as computer implementations using applications like Tensorflow and Pytorch are nowadays mainstream and known technologies and no detailed explanations are required for one of ordinary skill in the art of advanced image processing and computer vision technology. For convenience one may refresh knowledge of CNNs for instance by webpages https://victorzhou.com/blog/intro-to-cnns-part-1/ and https://victorzhou.com/blog/intro-to-cnns-part-2/ which enables one of ordinary skill to implement a computer vision CNN and which are incorporated herein by reference.

A modular architecture of an e-gimbal device is preferred. Preferably one uses identical cameras with identical components and assembled fixedly in identical structured and aligned within strict tolerances inside a single body. This enabled repeatability and repeatedly using identical parameters in the e-gimbal implementation.

Preferably, a calibration step should be implemented that creates a single contiguous extended image space. Before use, a stitching procedure may be used to align the overlap of image sensor images and smoothing any differences. This may be done factory side, allowing units to be fully calibrated. If desired one may provide slightly different parameters that allow to correct minor shifts in parameters due to environmental conditions like temperature changes. A system user may do an operational calibration check wherein the system optimizes any detected changes. While the calibration may take some time, once complete, the operational speed is no longer affected as optimal parameters are applied.

It was already disclosed herein that preferably one uses in the individual cameras a curved image sensor, for instance as provided by Curve-ONE S.A.S. of Levallois-Peret, France and as marketed on https://www.curve-one.com/ which is incorporated herein by reference. The use of curved sensors has several benefits. It allows automatic correct placement of the sensors for the panoramic pivot point. Furthermore, the curved sensor relieves some of the projective distortion on an otherwise flat sensor and allows for less expensive and compact lenses that cause less distortion. The concept of curved sensors is pursued by different organizations and one description may be found in U.S. Pat. No. 11,848,349 to Keefe et al., issued on Dec. 19, 2023 which incorporated herein by reference and is developed by HRL Laboratories, LLC of Malibu, CA. A curved image sensor is preferably a spherically curved image sensor.

Figure 27:
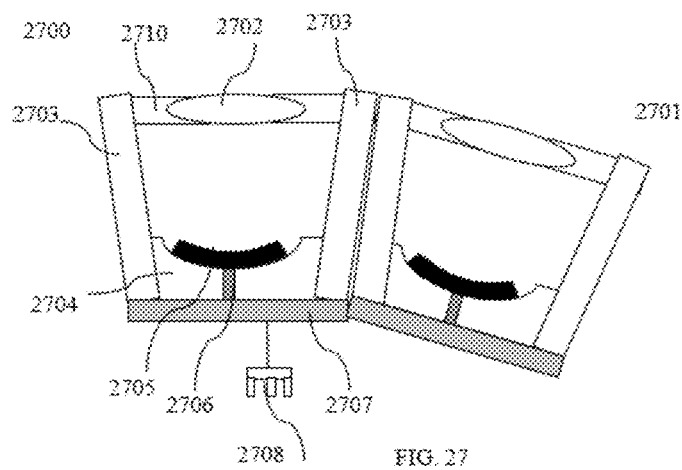
FIG. 27 illustrates schematically an image sensor/lens module in accordance with an aspect of the present invention.
Figure 28:
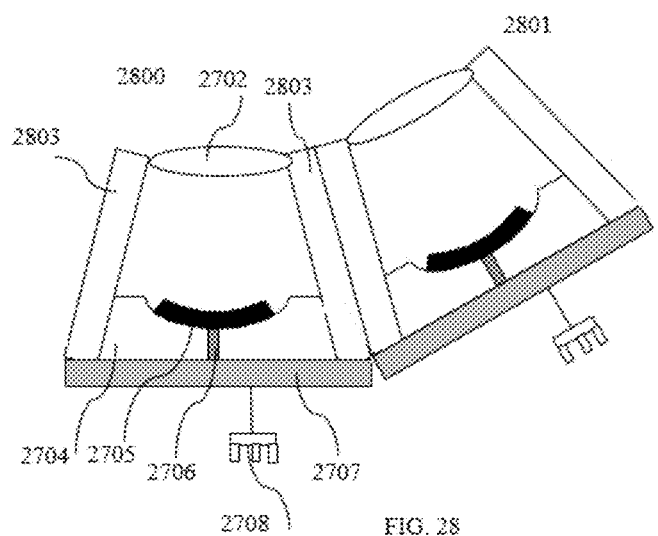
FIG. 28 illustrates schematically yet another image sensor/lens module in accordance with an aspect of the present invention.
Figure 29:
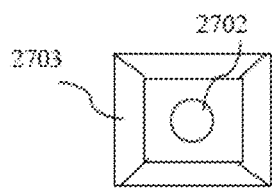
FIG. 29 provides schematically a top/above view of an image sensor/lens module.

The use of curved image sensor in accordance with an aspect of the present invention s applied in a modular build of an e-gimbal system. This is illustrated in FIG. 27. FIG. 27 shows two image sensor/lens modules: 2700 and 2701. These modules are identical and only 2700 is described in detail. FIG. 27 2700 provides a very schematic representation to highlight some shapes and parts, but is of course not an engineering schematic and measurements or shapes are not representative of the actual module, as one of ordinary skill understands. The sensor/lens module has a housing 2703 that holds all elements of the module. The shape of the housing is an inverted flatted pyramid or mastaba, with sloping sides of which the angles are carefully determined so images generated by the sensors have sufficiently overlap. The material of the housing may be ceramic or metal or a combination there of. However, the inside is preferably not reflective and may be treated with a coating to absorb any light coming through the lens 2702. For illustrative purposes 2702 is represented by a single ellipsoid, but in practice the lens may be a composite lens with several elements and positioned relatively much closer to the sensor 2705 than depicted herein. Lens 2702 is held in place by a ring structure 2710 which attaches the lens to the housing. On the bottom of the module is a carrier 2704 which may be a ceramic carrier, similarly with preferably non-reflective properties. On the carrier which has a hollow preferably spherical shape is placed, possibly through known depositing techniques a curved image sensor 2705 which corresponds to optical properties of lens 2702. In general one does not want a schematic with auxiliary parts absent or hanging or not provided. The harvesting of the image data is controlled by electronics, processor, memory as needed and including power source all as 2707. For convenience this is shown connected to the bottom of the carrier via connection 2706 and connector 2708 to connect the sensor control and output to further required equipment. Other configurations are possible and are fully contemplated. for instance some solutions show a connection/control unit next to the curved sensor 2705 which may make connection easier. Another configuration in shape is illustrated in FIG. 28 with modules 2800 and 2801. All components in 2800 and 2801 are identical to those of FIG. 27. Only the housing 2803 is different in shape and looks like the inverse of 2703. Furthermore wherein slanted housing 2703 and lens or lens system 2702 from an above view are identified. By selected the correct shape of the slope the modules may be stacked side by side, creating for instance a unit that covers a field of view of 180 degrees or even greater. The lens 2702 may be held to housing 2703 with a ring not shown, being bonded or otherwise attached, which is assumed but not shown as not to overcrowd the schematic representation.

One may provide the housing of the camera modules such as 2700 with outside and inside oriented ridges, deliberately positioned so when two modules are merged the two sets of complementary ridges automatically align the modules, which may then be bonded or fixedly attached to a common housing. One may provide the matching ridges a small amount of tolerance of fitting. Then using high accuracy mechanical manipulators or robotic arms one may accurately align the connecting modules thus creating the required overlap in the images in accordance with predefined active areas. This is where the connectors 2708 are helpful. These may be connected to a processor and based on the generated image data, the robotic arms will hold the modules in a desired position to achieve the required overlap and active areas. One may say that the camera modules with the help of processors may be assumed and are called herein to be self-aligning.

It is assumed that neural network technologies and more specifically convolutional neural networks (CNNs) are nowadays part of known technology in image processing and computer vision. For reader convenience to refresh knowledge on CNNs one is referred to https://victorzhou.com/blog/intro-to-cnns-part-1/ and https://victorzhou.com/blog/intro-to-cnns-part-2/ which are both incorporated by reference herein. Required instructions to invoke and implement CNNs are for instance part of the Pytorch and Tensorflow applications.

As disclosed herein an e-gimbal may be implemented in different ways wherein different conditions may play a role in selecting a preferred way to implement and/or apply a specific e-gimbal to create an image which is preferably a video image of a scene and/or object with a camera that may be moving of a scene or object that is static or is also moving. An e-gimbal system may be implemented using one or more neural networks, which preferably are Convolutional Neural Networks (CNNs). One may implement an e-gimbal system that ignores camera roll and/or keep the camera system stable against roll. E-gimbal implementation correcting camera roll also have been disclosed herein. In one embodiment of the present invention one may perform all instructions in real-time on the cameras system. This may require installing and using multiple computer processing units that may work in parallel fashioned and/or pipelined or work separately on sections of an image space, the processed sections to be recombined in a single e-gimbal window for display. The above also indicates that "a processor" herein is specifically means one or more processors, wherein a processor may mean a separately packaged device or part of a device such as a processor core as is known in computer technology. A processor also may be a GPU or NTU or TPU or dedicated customized processing circuitry such as FPGAs (Field Programmable Gate Arrays) or other customized processing circuitry. The difference between these processor types is described in website https://www.backblaze.com/blog/ai-101-gpu-vs-tpu-vs-npu/ which is incorporated herein by reference.

If so desired one may reduce computational requirements by for instance downsampling the image space as well as impose frame skipping. This may not substantially affect the quality of e-gimbal operations on a relatively small screen. One may apply full e-gimbal processing offline on a more powerful computer, on an edge computer on or a remote powerful cluster of servers. For that reason all positional data of inertial sensors, GPS device and compass and the like are recorded and provided with a time stamp that corresponds and may uniquely be matched with recorded image data. This enables offline creation of e-gimbal stabilized video images. Possibly more involved instruction sets that improve the quality of the images in an e-gimbal window.

The article 'a' herein means one or more, except in the case where one or single is intended and/or explicitly articulated. The above discloses several aspects and/or embodiments of the present invention. This means that several aspects are disclosed related to an e-gimbal. Each aspect may contain an inventive concept and the above is not limited to a single concept or single embodiment or single invention.

Herein, the term images data harvested from an image sensor is used. This refers to the known process of what is also called "reading" of image data from a sensor. As explained earlier, image data is captured by for instance Bayer cells, each containing at least 3 photo-detectors to distinguish Red-Green-Blue light using color filters for instance as raw image data that later is formed into a viewable image by the known process of demosaicing. One may harvest along so called scanlines. And one may determine how lines are scanned, for instance partially or in any step form. Furthermore, one may read lines in steps with jumps as the reading progresses along a line of physical pixel elements (for instance Bayer cells). For instance one may read a line of pixels on a line k out of 1200 lines from left to right. After reading 10 consecutive pixel elements on like k, the processor may read next the following 10 elements (11 to 20) on line k+1, for instance. Different types and orders of pixel readings are contemplated and may be implemented. One requirement is that pixels are read with sufficient speed, such as 60 frames per second, for instance.

This has been explained earlier. The scanline definition determines the active sensor area that is read into memory for processing. A processor may be programmed to "substantially" read only the active areas. Substantially means with a certain tolerance of reading excess pixels. Taking into account effects environmental conditions, like temperature and pressure, a relative position of image overlap may be slightly shifted, causing a shift in a pre-determined stitchline, and causing perhaps a misalignment of several, up to perhaps 10 or 15 pixels. This depends on conditions and materials such as housing material used. For that purpose one may harvest slightly more image data than dictated by a stitchline, allowing correction when the correct stitchline is determined during perhaps a calibration step. This deliberately extending the harvested active area is thus done on purpose to allow having data to correctly align image areas. Thus the harvested data may initially form substantially a registered image, perhaps requiring a minor adjustment in processing. Substantially thus means with a tolerance of up to 15 pixels beyond a defined stitchline, more preferably with a tolerance of up to 10 pixels beyond a defined stitchline and most preferably with a tolerance of up to 5 pixels beyond a defined stitchline.

In one embodiment of the present invention a real-time video stream is an image stream of 10 frames per second (fps) or greater and a standard video frame has 360,000 pixels or greater. This means that all operations required for realizing a real-time e-gimbal for moving cameras and/or moving recorded object may be performed by processor capacity available at least on current smartphones and/or common computing devices. This includes all required rotation compensation within field of vision of the extended image space. All of these operations may be performed real-time by for instance known OpenCV instruction, if required being implemented in compiled instructions. One may also apply more involved operations as provided herein over greater adverse conditions with more accurate results, including neural network based operations. In that case additional processing devices may be included on a cameras system. like a GPU, a NPU and/or a TPU. When even more computational power is required one may offload computation from the camera system to an edge device, for instance like the NVIDIA Jetson Nano. Other edge computing solutions may also be applied.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A processor implemented method, comprising:
   determining an extended image space of active areas of image sensors in at least a first camera and a second camera in a fixed position relative to the first camera in a common housing, active areas of image sensors of two or more cameras being determined by non-overlap of image areas generated by the image sensors of the at least first and second cameras, the extended image space representing a substantially registered image;
   recording a sequence of video frames with the active areas of the image sensors of the at least first and second cameras;
   collecting motion sensor data from one or more motion sensors associated with the common housing, wherein a movement of the common housing comprises at least one of a pitch, and a yaw;
   determining coordinates of a point in extended image space with the common housing in a first pointing direction of the common housing and determining modified coordinates of the point in extended image space with the common housing in a second pointing direction of the common housing based on data generated by the one or more motion sensors;

capturing image data determined by a window being smaller than a size of the extended image space around the modified coordinates of the at least one point in the extended image space in the second position; and displaying on the screen an image determined by the captured image data determined by the window.

2. The method of claim 1, wherein the movement of the common housing comprises at least one of a pitch, a roll and a yaw.

3. The method of claim 2, further comprising:
compensating the roll by scanline jumping based on the motion sensor data collected from the one or more motion sensors.

4. The method of claim 1, further comprising:
determining the coordinates of the point associated with the first pointing direction based on a center of an object in the extended image space.

5. The method of claim 4, further comprising:
tracking the object in the extended image space in extended image space by an object tracker and determining the modified coordinates based on coordinates of the tracked object in extended image space with the common housing in the second position, wherein a center of the tracked object is a center of an e-gimbal window.

6. The method of claim 4, further comprising:
training a convolutional neural network to perform object tracking in the extended image space.

7. The method of claim 1, wherein the first and second cameras are identical and have a curved image sensor.

8. The method of claim 1, wherein the first and second cameras are self-aligning.

9. The method of claim 1, further comprising:
displaying the captured image data at a frame rate of at least 10 frames per second.

10. The method of claim 1, further comprising:
associating with a neural network data generated by the one or more motion sensors with modified coordinates in the extended image space.

11. The method of claim 1, further comprising:
predicting by a neural network one or more rotation corrective instructions based on one or more inputs from the positional sensors.

12. A camera system, comprising:
one or more storage devices enabled to store data, including instructions;
a screen to display an image;
one or more processors, enabled to retrieve instructions from the one or more storage devices, the instructions when executed by the one or more processors cause to carry out computer functions, comprising:
determining an extended image space of active areas of image sensors in at least a first camera and a second camera in a fixed position relative to the first camera in a common housing, active areas of image sensors of two or more cameras being determined by non-overlap of image areas generated by the image sensors of the at least first and second cameras, the extended image space representing a substantially registered image;

recording a sequence of video frames with the active areas of the image sensors of the at least first and second cameras;

collecting motion sensor data from one or more motion sensors associated with the common housing, wherein a movement of the common housing comprises at least one of a pitch, and a yaw;

determining coordinates of a point in extended image space with the common housing in a first pointing direction of the common housing and determining modified coordinates of the point in extended image space with the common housing in a second pointing direction of the common housing based on data generated by the one or more motion sensors;

capturing image data determined by a window being smaller than a size of the extended image space around the modified coordinates of the at least one point in the extended image space in the second position; and displaying on the screen an image determined by the captured image data determined by the window.

13. The camera system of claim 12, wherein the movement of the common housing comprises at least one of a pitch, a roll and a yaw.

14. The camera system of claim 13, further comprising to carry out the computer function:
compensating the roll by scanline jumping based on the motion sensor data collected from the one or more motion sensors.

15. The camera system of claim 12, further comprising:
determining the coordinates of the point associated with the first pointing direction based on a center of an object in the extended image space.

16. The camera system of claim 15, further comprising:
tracking the object in the extended image space by an object tracker and determining the modified coordinates based on coordinates of the tracked abject in extended image space with the common housing in the second position.

17. The camera system of claim 15, further comprising:
training a convolutional neural network to perform object tracking in the extended image space.

18. The camera system of claim 12, wherein the first and second cameras are identical and have a curved image sensor.

19. The camera system of claim 12, further comprising:
associating with a neural network data generated by the one or more motion sensors with modified coordinates in the extended image space.

20. The camera system of claim 12, further comprising:
predicting by a neural network one or more rotation corrective instructions based on one or more inputs from the positional sensors.

* * * * *